United States Patent
Roy et al.

(10) Patent No.: US 9,961,565 B2
(45) Date of Patent: *May 1, 2018

(54) METHOD FOR MILLIMETER WAVE BEAM TRACKING

(71) Applicant: IDAC Holdings, Inc., Wilmington, DE (US)

(72) Inventors: Arnab Roy, Conshohocken, PA (US); Ravikumar V. Pragada, Conshohocken, PA (US); Philip J. Pietraski, Melville, NY (US); Bharath Viswanathan, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/488,146

(22) Filed: Apr. 14, 2017

(65) Prior Publication Data

US 2017/0223552 A1    Aug. 3, 2017

Related U.S. Application Data

(63) Continuation of application No. 14/423,362, filed as application No. PCT/US2013/057101 on Aug. 28, 2013, now Pat. No. 9,629,171.

(Continued)

(51) Int. Cl.
*H04W 16/28* (2009.01)
*H04W 24/08* (2009.01)
*H04W 64/00* (2009.01)

(52) U.S. Cl.
CPC .......... *H04W 16/28* (2013.01); *H04W 24/08* (2013.01); *H04W 64/003* (2013.01)

(58) Field of Classification Search
CPC .... H04W 16/28; H04W 24/10; H04B 7/0617; H04B 7/0602

See application file for complete search history.

(56) References Cited

U.S. PATENT DOCUMENTS

2006/0194587 A1\* 8/2006 Sharony ................ G01S 5/0252
                                                           455/456.1
2009/0141662 A1    6/2009 Gurney et al.
(Continued)

FOREIGN PATENT DOCUMENTS

EP    2 219 299      8/2010
JP    2010-161513 A2    7/2010
(Continued)

OTHER PUBLICATIONS

Abu-Surra et al., "NT-12 on Beamforming (BRP)," IEEE 802.11-10/0450r3 (May 2010).
IEEE P802.11ad/D9.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad/D9.0 (Jul. 2012).

(Continued)

*Primary Examiner* — Omoniyi Obayanju
(74) *Attorney, Agent, or Firm* — Volpe and Koenig, P.C.

(57) ABSTRACT

A wireless transmit/receive unit (WTRU) may receive a request to perform directional signal strength measurements and provide location data associated with the WTRU. The WTRU may transmit directional signal strength measurements, based on the request and the location data associated with the WTRU, to facilitate generation of a directional radio environment map (DREM). The WTRU may receive a request to switch to a new transmission and reception beam pair based on the DREM.

13 Claims, 28 Drawing Sheets

Related U.S. Application Data

(60) Provisional application No. 61/774,979, filed on Mar. 8, 2013, provisional application No. 61/694,162, filed on Aug. 28, 2012.

(56) References Cited

U.S. PATENT DOCUMENTS

| | | |
|---|---|---|
| 2012/0276901 A1 | 11/2012 | Kruglick |
| 2013/0088983 A1 | 4/2013 | Pragada et al. |
| 2013/0121185 A1* | 5/2013 | Li .................. H04W 72/046 370/252 |
| 2015/0004918 A1 | 1/2015 | Wang et al. |

FOREIGN PATENT DOCUMENTS

| | | |
|---|---|---|
| JP | 2011-250065 A2 | 12/2011 |
| WO | 2009/087808 A1 | 7/2009 |
| WO | 2009/102124 | 8/2009 |
| WO | 2009/128599 | 10/2009 |
| WO | 2010/071492 | 6/2010 |
| WO | 2013/086410 | 6/2013 |

OTHER PUBLICATIONS

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information Technology—Telecommunications and information exchange between systems—Local and metropolitan area networks—Specific requirements; Part 15.3: Wireless Medium Access Control (MAC) and Physical Layer (PHY) Specifications for High-Rate Wireless Personal Area Networks (WPANs); Amendment 2: Millimeter-wave-based Alternative Physical Layer Extension, IEEE 802.15.3c-2009 (Oct. 2009).

* cited by examiner

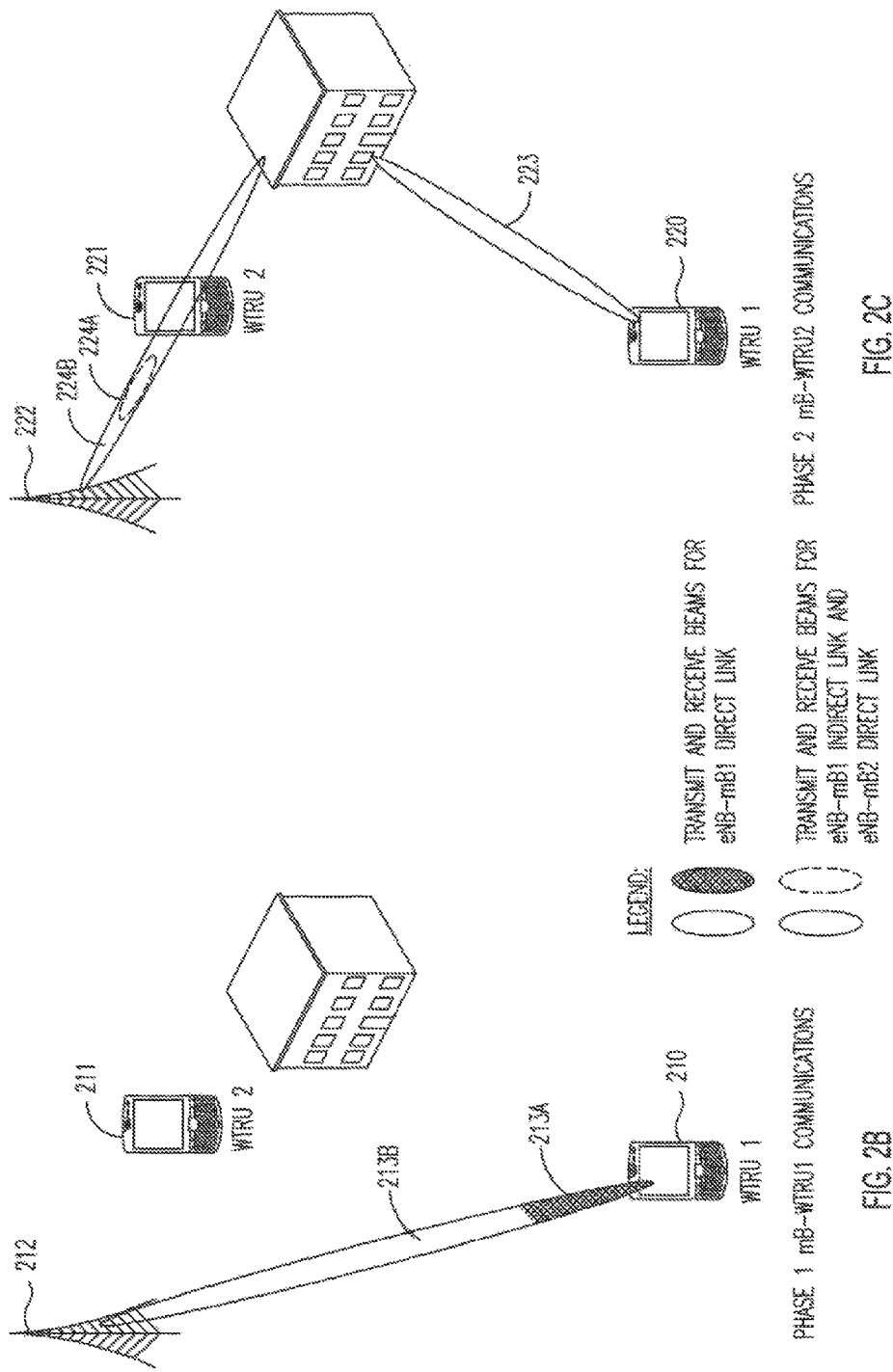

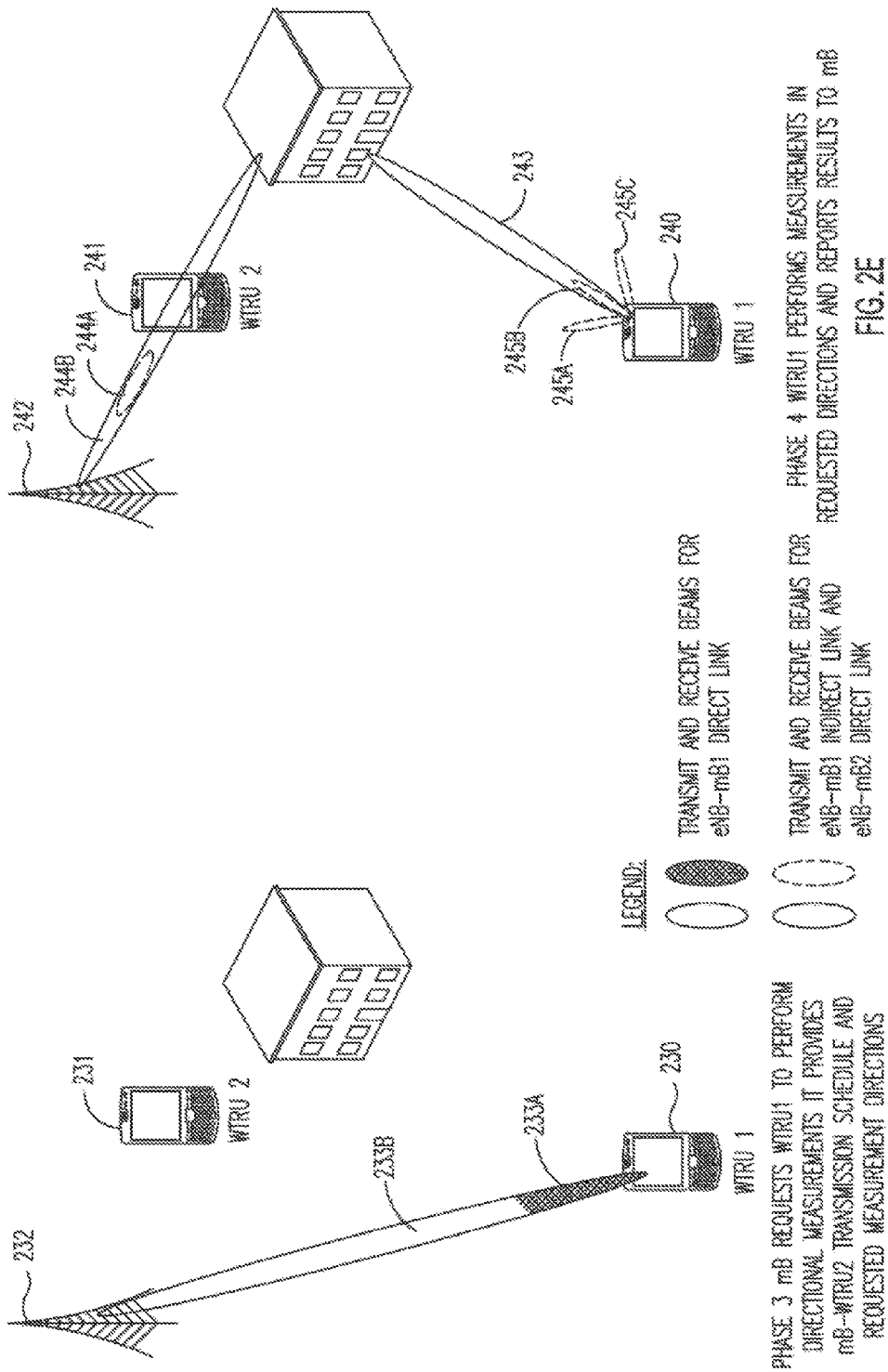

DIRECTIONAL MEASUREMENT REQUEST — 263

| START TIME | MEASUREMENT INTERVAL | MEASUREMENT COUNT | START AZIMUTH | START ELEVATION | AZIMUTH STEP | ELEVATION STEP | MEASUREMENT CONTROL |
|---|---|---|---|---|---|---|---|
| 261 | 262 | 264 | 265 | 266 | 267 | 268 | 269 |

DIRECTIONAL MEASUREMENT REPORT — 273

| AZIMUTH | ELEVATION | RCPI/RSNI | Rx ANTENNA GAIN |
|---|---|---|---|
| 271 | 272 | 274 | 275 |

BEAM SWITCH — 282

| SWITCH TRIGGER | AZIMUTH OFFSET | ELEVATION OFFSET | TSPEC/QoS SPECIFICATION | SIGNAL STRENGTH LOSS | SWITCH TIME | SWITCH CONTROL | HO ADDRESS | HO PARAMETERS |
|---|---|---|---|---|---|---|---|---|
| 281 | 283 | 284 | 285 | 286 | 287 | 288 | 289 | 290 |

FIG. 2G

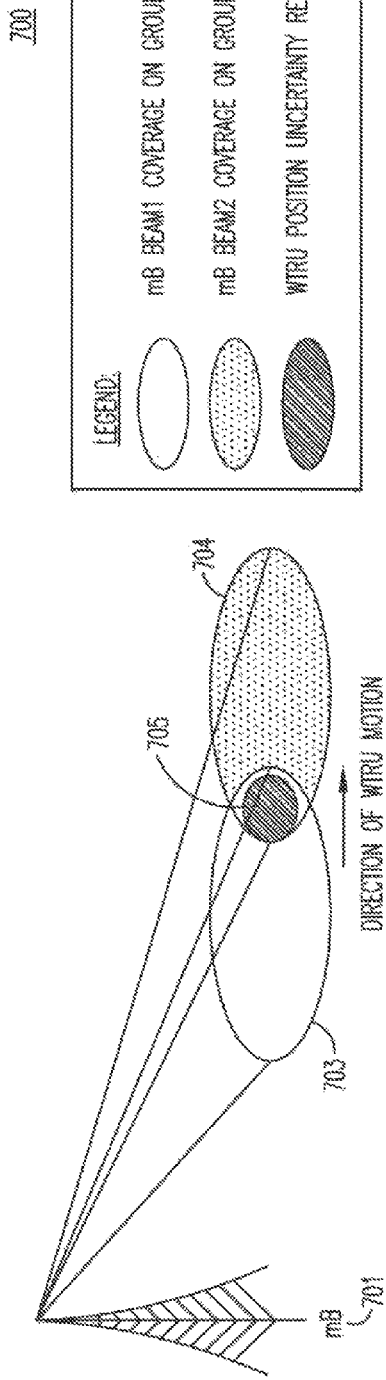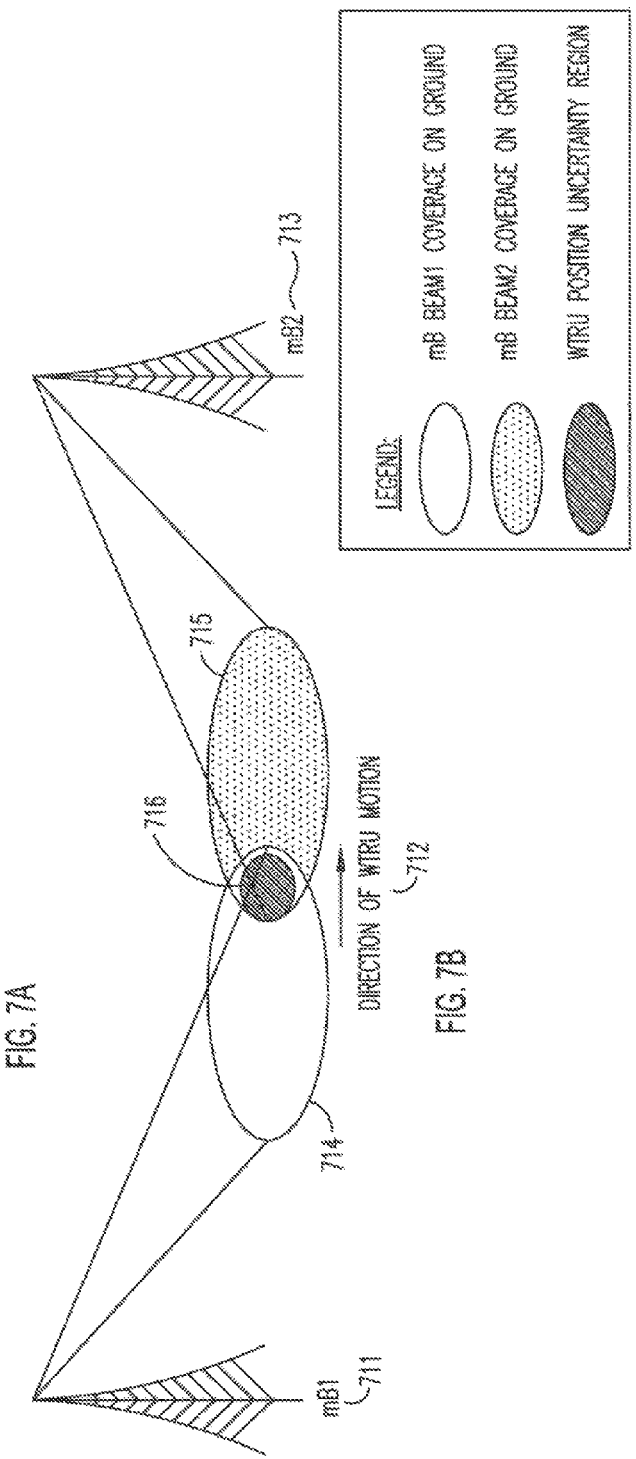
FIG. 7A
FIG. 7B

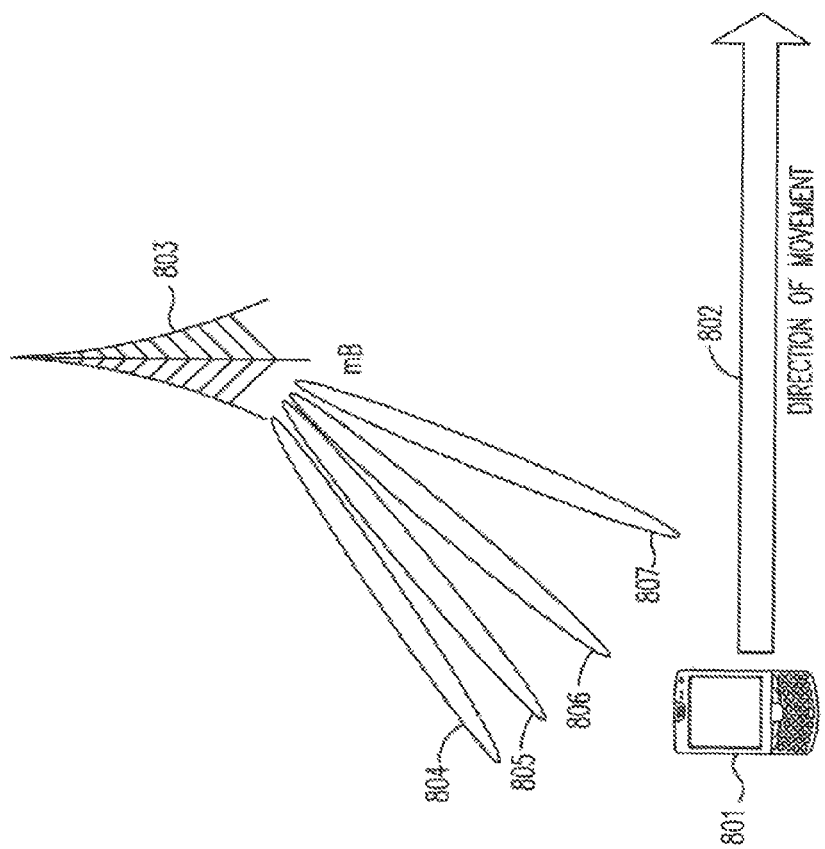

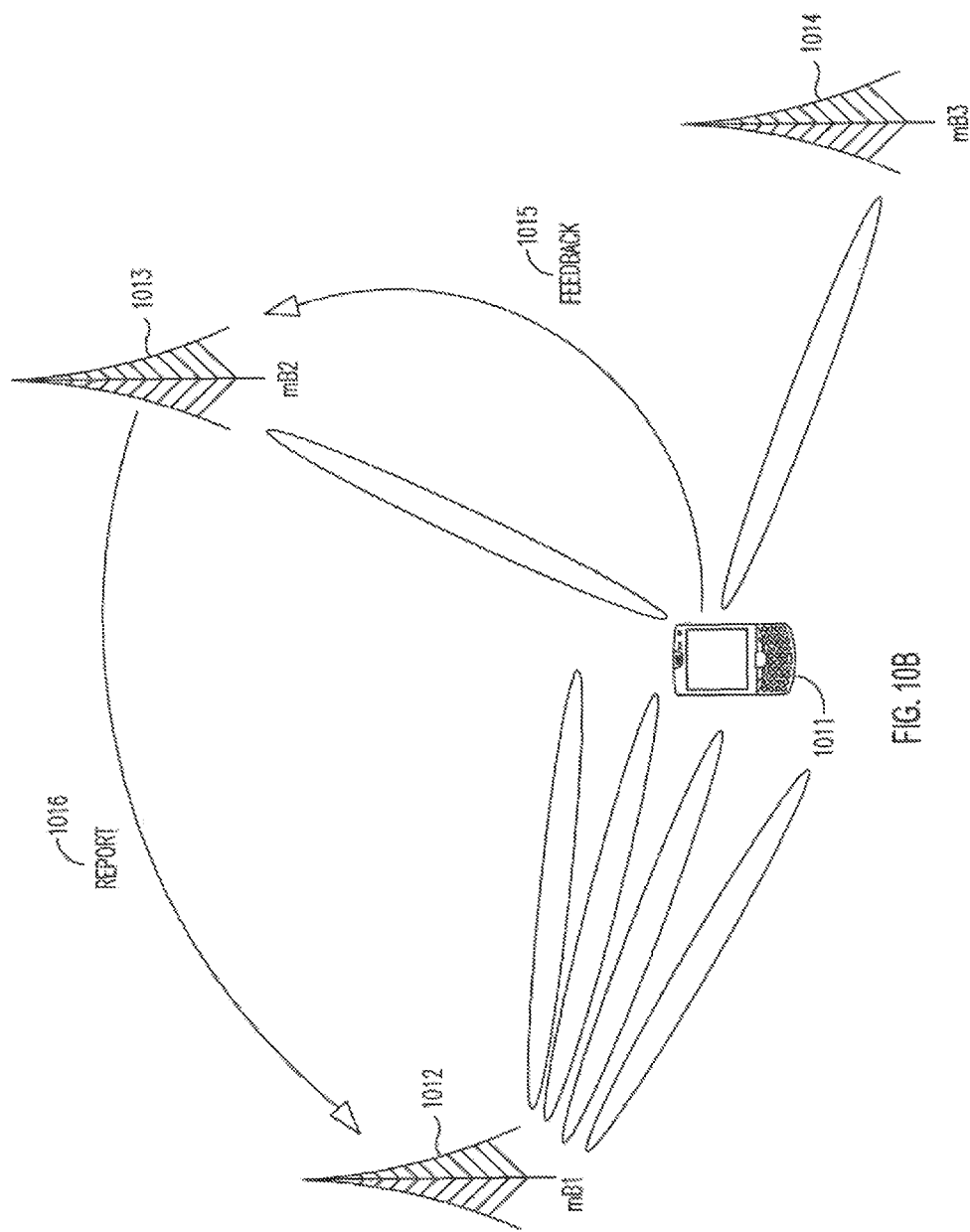

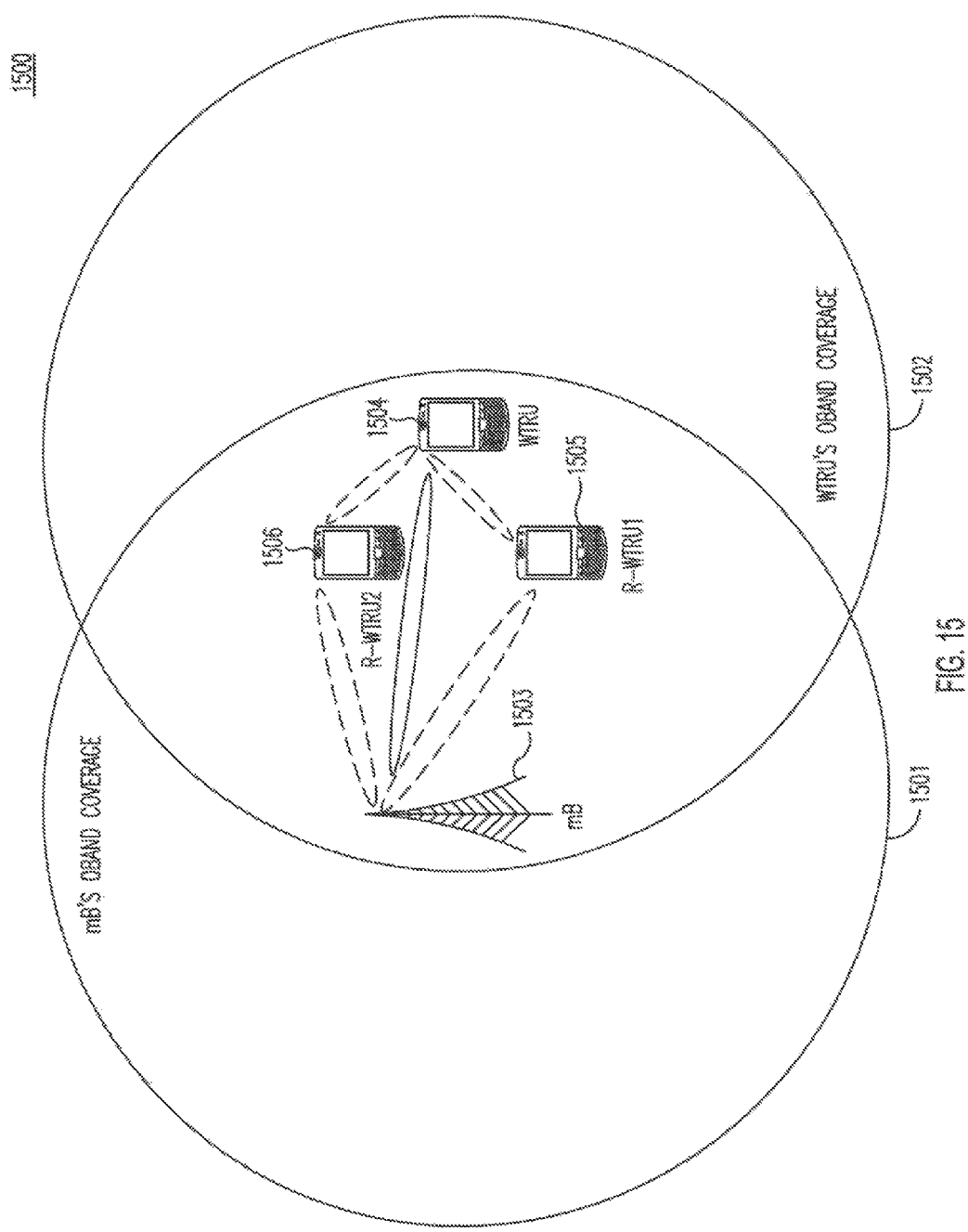

METHOD FOR MILLIMETER WAVE BEAM TRACKING

CROSS REFERENCE TO RELATED APPLICATIONS

This application is a continuation of U.S. Non-Provisional application Ser. No. 14/423,362 filed Feb. 23, 2015, which is the U.S. National Stage, under 35 U.S.C. § 371, of International Application No. PCT/US2013/057101 filed Aug. 28, 2013, which claims the benefit of U.S. Provisional Application Ser. No. 61/694,162 filed Aug. 28, 2012 and U.S. Provisional Application Ser. No. 61/774,979 filed Mar. 8, 2013, the contents of which are hereby incorporated by reference herein.

BACKGROUND

High frequencies offer the potential of wide bandwidths. The narrow beamforming enabled at these frequencies (along with high penetration losses) provides high spatial containment of the transmitted signals. These frequencies may be referred to as millimeter wave (mmW) frequencies. The precise frequency range may range from approximately 28 GHz to 160 GHZ or 300 GHz with a special interest in the unlicensed V-band (60 GHz band) and E-band (70/80/90 GHz point-to-point band). Even higher frequencies, (sometimes referred to as terahertz (THz)), may be used and may be are applicable. The V-band is of particular interest due to the ~7 GHz, (depending on country) of unlicensed spectrum available and the growing ecosystem of under-development standards such as WiGig, WirelessHD and the like. Existing 60 GHz standards such as Institute of Electrical and Electronics Engineers (IEEE) 802.11ad and IEEE 802.15.3c specify procedures for initial beam acquisition and subsequent beam tracking. However, these procedures are inadequate to address more challenging wireless transmit/receive unit (WTRU) mobility scenarios in outdoor applications. Moreover, they do not leverage measurements from neighboring cells to aid WTRU tracking.

SUMMARY

Methods and apparatuses are described herein to perform and improve mmW beam tracking. Described herein are localization methods to improve predictions of the position of a WTRU, which may allow a millimeter wave base station (mB) to appropriately select a modified beam without having to perform beam acquisition every single time a WTRU moves. Localization techniques in which an mB may control a directional measurement campaign in order to generate a directional radio environment map (DREM) are described herein. The mB may request associated WTRUs to perform directional signal strength measurements, which may then be reported back to the mB. The mB may then generate a DREM based on the directional signal strength measurement reports, which may be used to identify secondary links when a primary link fails. Another application of the DREM is to determine possibilities for multiple simultaneous transmissions to different WTRUs. The mB may store the DREM in a database for network access by other mBs and for secondary link selection.

Also described herein are additional localization techniques using internal/external information for prediction. The information may be time-stamping, signal strength measurement, location information (global positioning system (GPS) coordinates), and inputs from internal devices such as gyroscopes, accelerometers, and the like. Another example method may use the previous history of used beams and other historical data such as mapped terrain information. In yet another example, data obtained from mB-mB cooperation including feedback information and reference signaling information may be used. Using group movement of WTRUs to perform beam tracking of a WTRU group is also described. Beam tracking for directional relays and initial beam training optimization methods are also described. Finally, WTRU localization precision improvement, beamwidth adaptation, and assisted beam tracking and handover methods are disclosed herein.

BRIEF DESCRIPTION OF THE DRAWINGS

A more detailed understanding may be had from the following description, given by way of example in conjunction with the accompanying drawings wherein:

FIG. 2B is an example of a first phase of mB controlled directional measurements;

FIG. 2C is an example of a second phase of mB controlled directional measurements;

FIG. 2D is an example of a third phase of mB controlled directional measurements;

FIG. 2E is an example of a fourth phase of mB controlled directional measurements;

FIG. 2G is an example of a Directional Measurement frame;

FIG. 7A is an example in which an mB has two beams and may select a beam based on WTRU movement;

FIG. 7B is an example of how location information may be used for improved handover decisions;

FIG. 8 is an example in which a WTRU may be tracked using historical data;

FIG. 10B is an example of mB to mB communication signaling;

FIG. 15 is an example of beam tracking via omni-directional band (OBand) signaling;

DETAILED DESCRIPTION

Figure 1A:
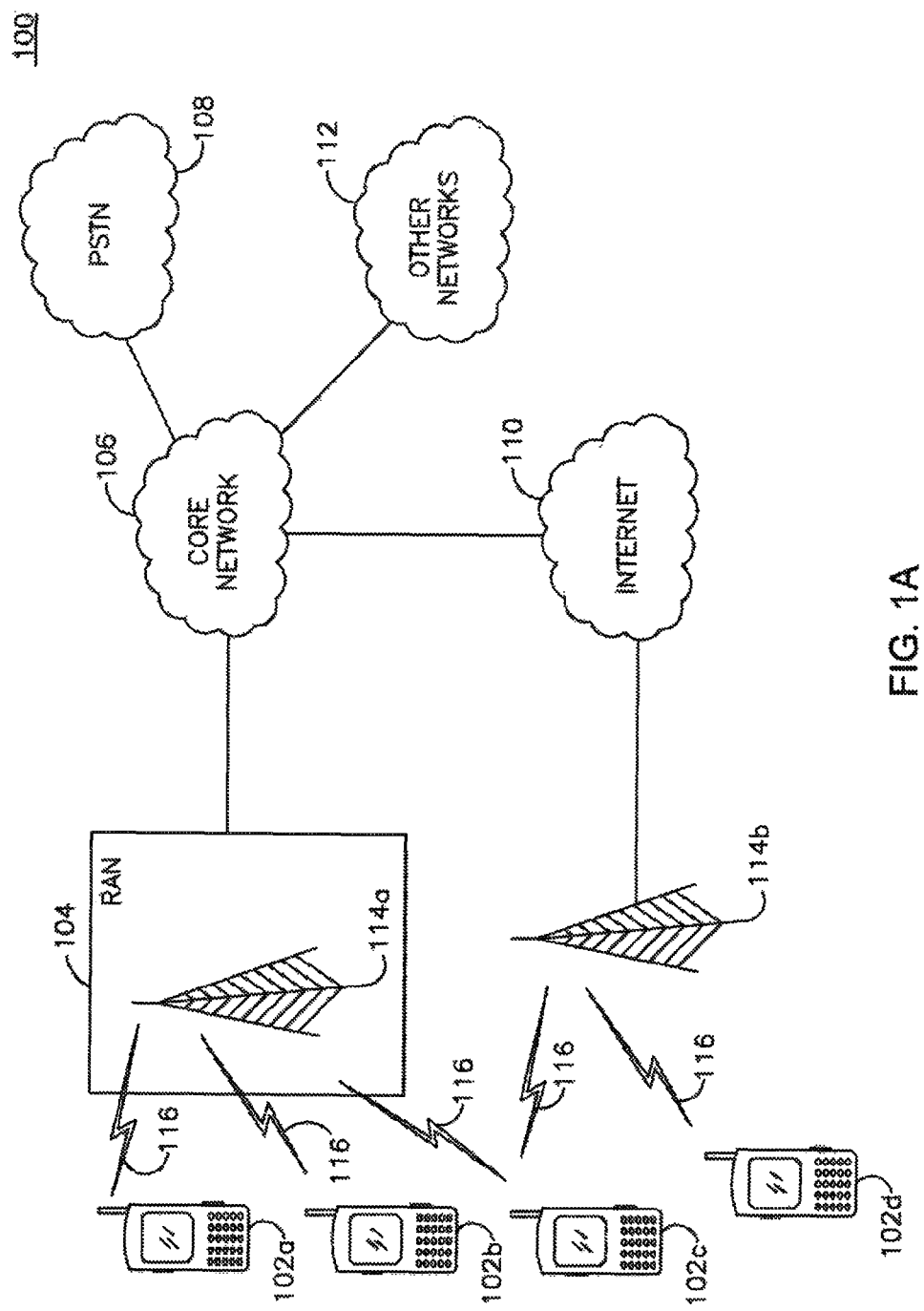
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
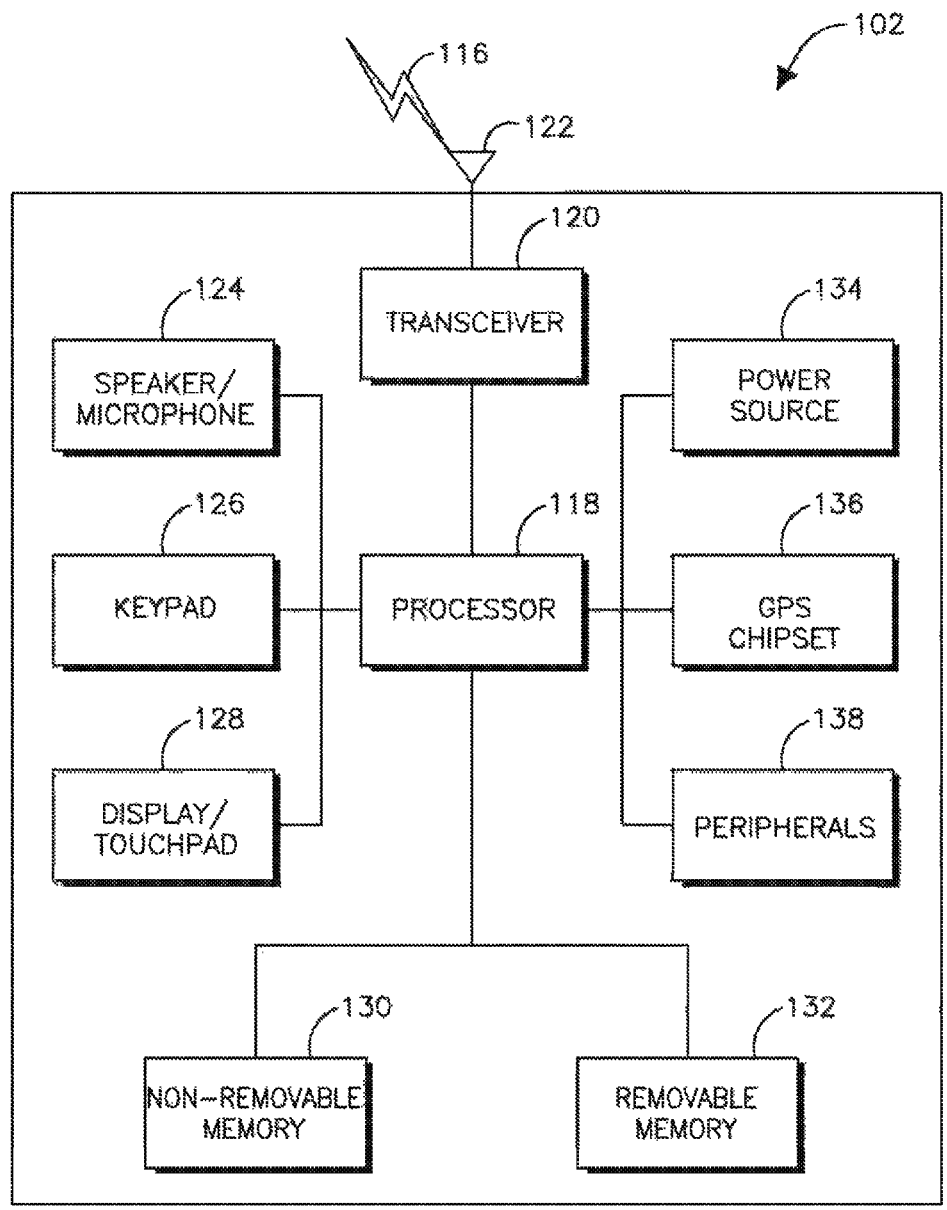
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
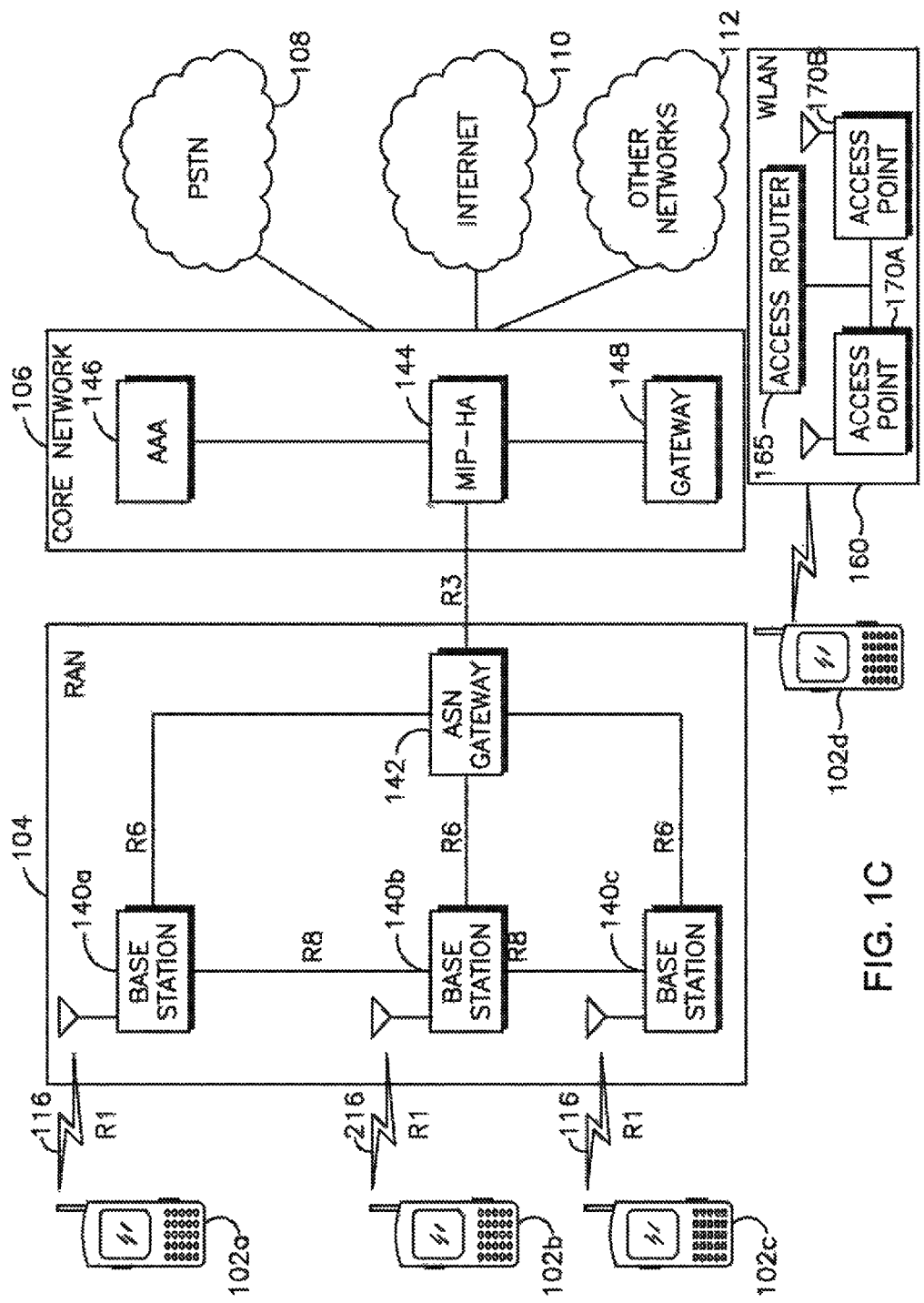
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. The base stations 140a, 140b, 140c may be a base transceiver station (BTS), a Node-B, an eNode B, a Home Node B, a Home eNode B, a site controller, an access point (AP), a wireless router, and the like. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 142 may be defined as an R6 reference point. The R6 reference point may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 and the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

An access router (AR) 165 of a wireless local area network (WLAN) 160 may be in communication with other networks 112 including the Internet 110 via the core network 106. The AR 165 may facilitate communications between APs 170a and 170b. The APs 170a and 170b may be in communication with WTRU 102d, which may provide the WTRU 102d with access to packet-switched networks, such as the Internet 110, to facilitate communications between the WTRUs 102a, 102b, 102c and IP-enabled devices.

Communication systems using highly directional links require their beams to be oriented in a way such that they point towards each other. This process is generally referred as beam acquisition. This may use the exchange of special signal bursts or sounding frames between the nodes. Beam acquisition establishes the initial beam configuration between corresponding nodes, enabling them to initiate communications. However, the initial antenna configuration discovered after beam acquisition may be rendered non-optimum due to substantial relative motion between the communicating nodes. Therefore, the optimum pair of beams between the nodes may be improved by being constantly updated based on their relative motion. This process is called beam tracking and is usually a simpler procedure than initial beam acquisition, with the beam search space restricted to a few candidates that are closely related to the last known optimum beam in some sense. Beam tracking enhancements that involve directional measurements and message exchanges between the millimeter wave base station (mB) and WTRU and between mBs are described herein.

Beam tracking enables directional communications between nodes while subject to relative motion and orientation data changes and follows initial beam acquisition, where initial beam orientation between nodes is determined. The aim of the beam tracking function is to adapt the transmission and reception beam patterns at both ends of a communication link, starting from the initial beamforming training configuration. Enhancements to the IEEE 802.11ad standard to suit high-mobility outdoor deployments of future millimeter wave systems are described herein as an example. However, the described procedures can be applied to any other directional communication system. The terms millimeter wave Base station (mB) and WTRU used herein correspond to an access point (AP) and station (STA) in IEEE 802.11ad standard, respectively. Alternately, it could refer to Piconet Controller (PNC) and Device (DEV) in an IEEE 802.15.3c system, respectively. An mB may also be any type of wireless device capable of operating AP/BS likes features. For example, an mB may refer to a WTRU used for tethering so that other mobile devices may share an internet connection with the WTRU. An mB may also refer to any WTRU used as a mobile hotspot.

Localization methods to improve the prediction of the positions of a WTRU, which may allow an mB to appropriately select a modified beam, are described herein in accordance with one embodiment. The methods described may be applied to determine the location of the WTRU and to help track the WTRUs movement without having to perform beam acquisition every single time a WTRU moves. The methods described herein may be applied in collaboration in order to increase the accuracy of the predictions of the position of the WTRU and therefore improve secondary beam selection.

Measuring signal strength for example may be one technique used for improving beam tracking. The measurement of signal strength of a beacon signal may be done using factors including but not limited to the frequency and power of a signal. The concept of the Doppler Effect may be used to accomplish this task. The Doppler Effect occurs when an object, such as a WTRU, moves with respect to another stationary object (mB). The received frequency of the waves emitted from the stationary object change according to the moving object's motion. As a result, when a WTRU moves with respect to a stationary object, the frequency of the waves transmitted from the WTRU may change. These relative changes in frequency occur because as the WTRU is moving toward a stationary observer, each successive wave crest may be emitted from a position closer to the stationary observer than the previous wave and may take less time to reach the observer than the previous wave. This reduction in the time between the arrivals of successive wave crests may cause an increase in the frequency. While the WTRU is moving, the distance between successive wave fronts may be reduced, so the waves appear to bunch together. Similarly, if the WTRU is moving away from the stationary observer, each wave may be emitted from a position farther from the stationary observer than the previous wave, and as a result, the arrival time between successive waves is increased, which reduces the frequency. The distance between successive wave fronts is increased, so the waves appear to spread out.

An observation similar to the Doppler Effects may be made when the power of beacon signals received from an mB is observed. When the moving WTRU gets closer to the stationary mB, the measured power of the signal may increase, and as the WTRU moves away, the power may decrease because the signal has traveled a longer distance to reach the WTRU and may have deteriorated. The WTRU may also measure the power of any other mBs within listening range, and the WTRU may then use for example, a triangulation technique with the collected information to determine its location.

By measuring the difference in power due to the movement of the WTRU with respect to all the possible mBs in range, the movement of the WTRU may be tracked. The beam direction may be changed accordingly to facilitate the strongest link between the WTRU and mB. Therefore, measurement, reporting, and prediction techniques may be used to establish the strongest link at various positions of the WTRU in movement. The WTRU may make measurements that record changes in the frequency or power of a received signal that may be used by the mB to determine the position of the WTRU.

Figure 2A:
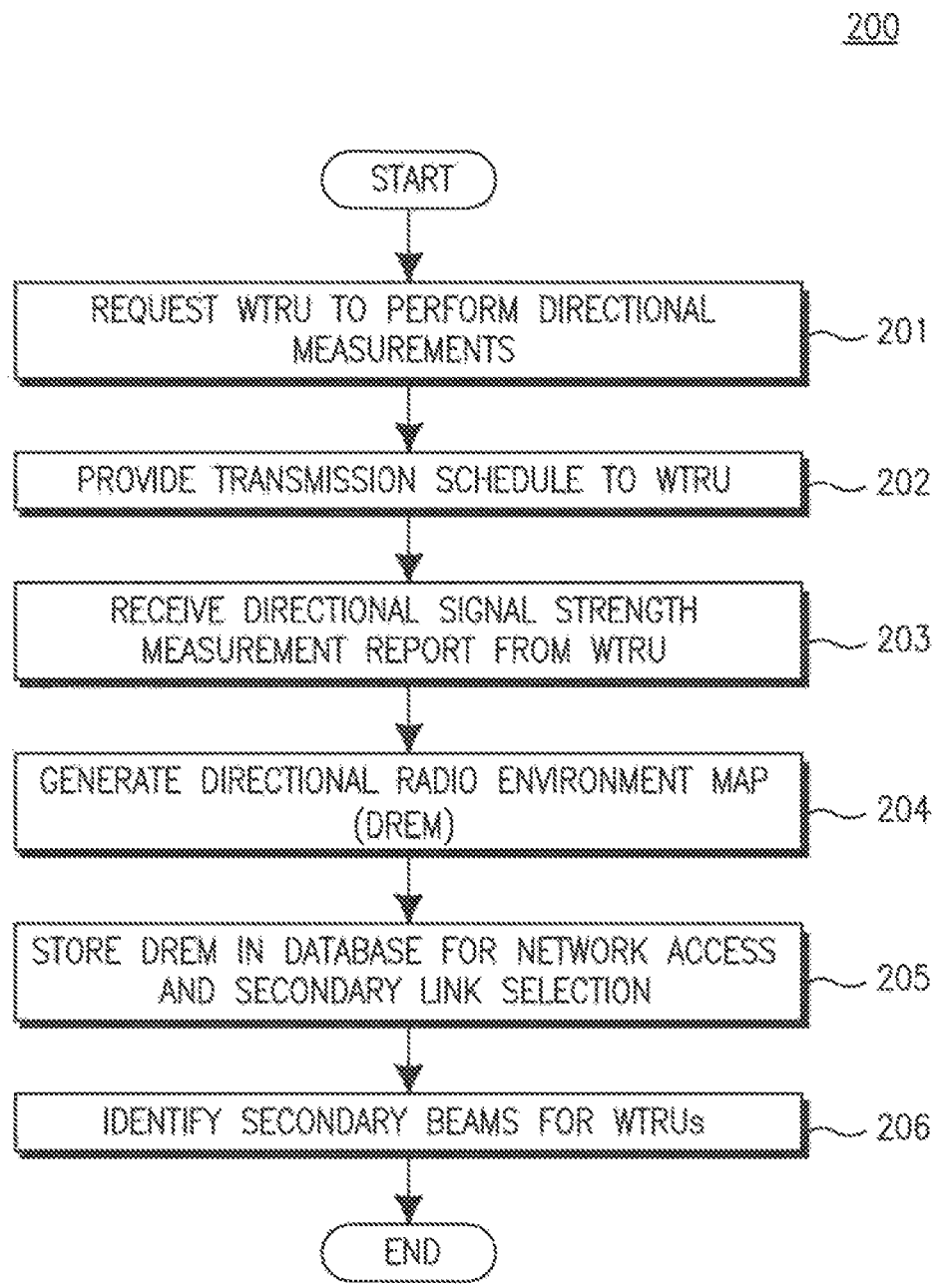
FIG. 2A is a high level flow chart in which the mB may control a directional measurement campaign in order to generate a directional radio environment map (DREM)

FIG. 2A provides a high level flow chart in which the mB may control a directional measurement campaign in order to generate a directional radio environment map (DREM) for use in improved beam tracking and simplified handovers in accordance with one embodiment 200. The mB may request associated WTRUs to perform directional signal strength measurements 201 on signals addressed to them. An mB may also request that associated WTRUs report directional signal measurements 201 on messages addressed to other WTRUs. The mB may either specify the receive directions from which to request measurements 201, and also the associated antenna configuration (beamwidth, gain, and the like) to use, or may let the WTRU decide the measurement directions. Alternatively or additionally, the mB may request the WTRU perform directional signal strength measurements 201 when nodes such as other WTRUs and/or mBs belonging to other networks are transmitting. These directional signal strength measurements 201 may apply to the broadcast beacon messages in the IEEE 802.11ad standard, 802.11aj, 802.15.3c or other similar standards. The WTRU directional signal strength measurements 201 may be performed either using a quasi-omni antenna pattern corresponding to Control PHY reception or with directional reception if it is already associated.

The mB may also provide a transmission schedule 202 to the WTRU. This may include the measurement schedule (including but not limited to time and frequency information) and the direction and antenna configuration for these measurements. This may enable the WTRU to make multiple directional signal strength measurements when data transmission is scheduled between another WTRU in the network and the mB.

The mB then may receive directional signal strength measurement reports 203 from the WTRU. The WTRU may report 203 the measured signal strength of received transmissions from the mB in terms of a Received Signal Strength Indicator (RSSI). This may be time-averaged over an appropriate duration to counter signal fading. The averaging interval used may capture WTRU dynamics when it is short enough. Additionally, the WTRU may be required to report 203 its antenna configuration such as receive beamwidth, antenna gain, and the like to the mB along with measurement results. The WTRU may report 203 the measurement results either to its serving mB or to neighbor mBs if it is associated with them. Also, when the WTRU determines the measuring directions, the measurement report 203 may include the directions covered and the antenna configuration used along with the measurements. From the signal strength measurement reports 203, the serving mB may estimate the WTRU range and may modify its associated beam.

The mB may then generate 204 a directional radio environment map (DREM) based on the directional signal strength measurement reports. The measurement reports may enable the mB to generate 204 DREM, which may include data about its surroundings including measurements on intra-cell and inter-cell signals. Note that DREM may also include historical information gathered from previous measurement reports and possibly from different WTRUs. Antenna configurations resulting in received signal strength at the WTRU larger than a configurable or predetermined threshold may be retained as secondary WTRU-mB1 links that may get activated when the primary line-of-sight (LoS) link may become obstructed or experiences interference without conducting a complete beam training procedure. Based on these reports the mB may perform beam tracking and identification of non line-of-sight (nLoS) communication possibilities. Another application of the DREM is to determine possibilities for multiple simultaneous transmissions to different WTRUs. The mBs may be expected to have capabilities to transmit to multiple WTRUs at the same time, either in the same direction or in distinct directions using Space Division Multiplexing (SDM) and Multi-User Multiple Input Multiple Output (MU-MIMO) techniques. Multiple simultaneous transmissions based on SDM techniques may identify WTRUs with small cross-interference between their individual beams. WTRUs in MU-MIMO systems sharing the same mB beam may also identify the WTRUs.

The mB may store 205 the DREM in a database for network access by other mBs or a central network entity and for secondary link selection. The mB may then identify 206 secondary beams for WTRUs based on the DREM. The mB may handover from the primary beam to the secondary beams based on the DREM when the primary beam becomes disrupted.

FIGS. 2B-2F provide an example of mB controlled directional measurements that may be used to generate a DREM, in which an mB directs a WTRU to make directional signal strength measurements.

FIG. 2B provides an example of a first phase of mB controlled directional measurements. WTRU1 210 may be communicating with mB 212 over a direct LoS link with receive beam 213a and transmit beam 213b. WTRU2 211 may not be communicating.

FIG. 2C provides an example of a second phase of mB controlled directional measurements. In this phase, mB 222 may not have a direct LoS link with WTRU1 220, but a viable alternate reflected link may exist 223. WTRU2 221 may be communicating over a direct LoS link with receive beam 224a and transmit beam 224b.

FIG. 2D provides an example of a third phase of mB controlled directional measurements. To identify any existing secondary links, mB 232 may request WTRU1 230 make directional signal strength measurements while communicating over a direct LoS link with receive beam 233a and transmit beam 233b. WTRU2 231 may not be communicating. mB 232 may also direct WTRU1 230 to make multiple directional signal strength measurements when data transmission is scheduled on the mB1 232 to WTRU2 231 link.

FIG. 2E provides an example of a fourth phase of mB controlled directional measurements. Following the request to make directional signal strength measurements, WTRU1 240 may perform measurements in the requested directions 245a, 245b, and 245c and may report results to mB 242. This may include making measurements when data transmission is scheduled on the mB 242 to WTRU2 241 link. In this phase, WTRU1 240 may have an indirect or reflected link 243 with mB 242. WTRU2 241 may be communicating with mB 242 over a direct LoS link with receive beam 244a and transmit beam 244b.

Figure 2F:
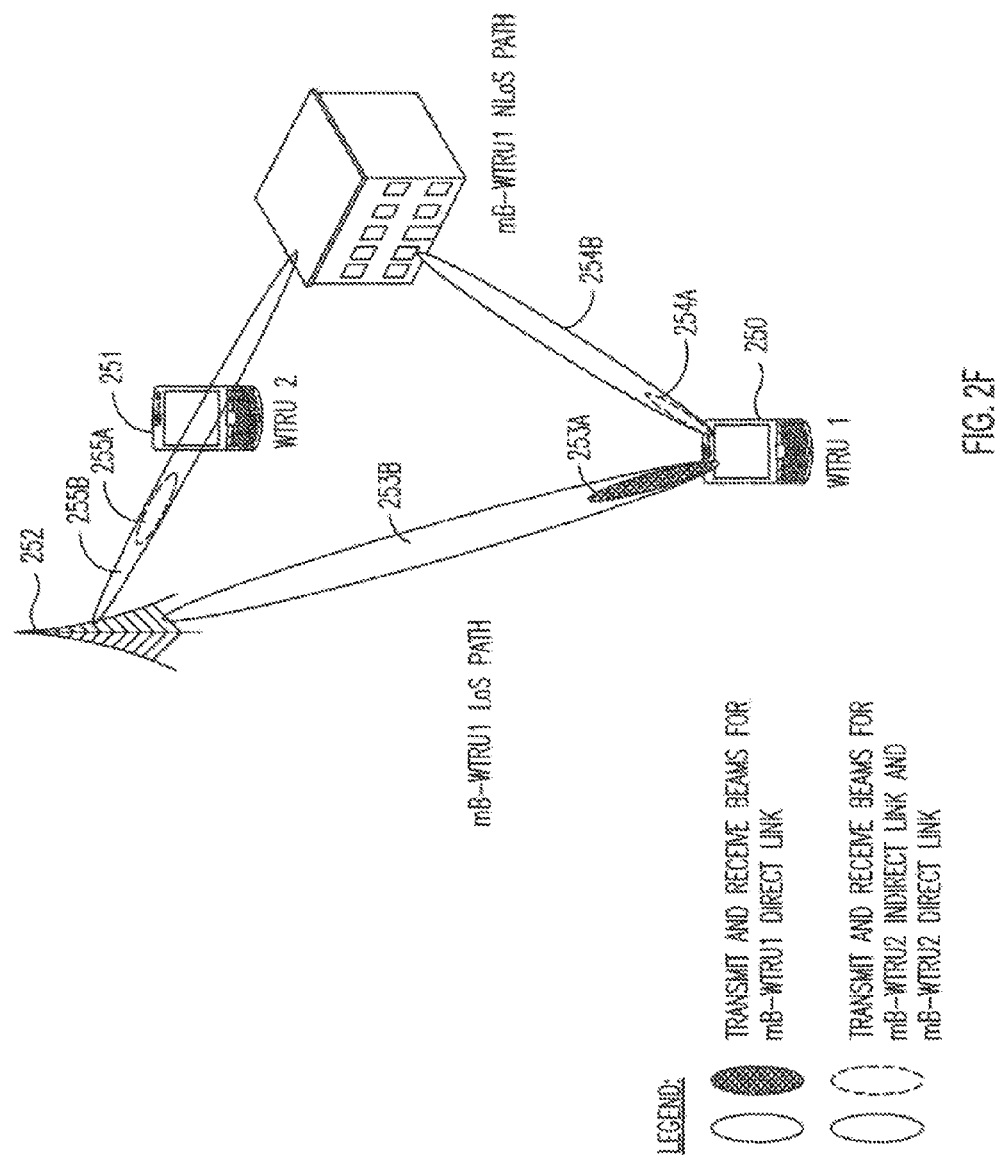
FIG. 2F is an example of secondary link discovery at a WTRU following directional signal strength measuring and reporting.

FIG. 2F provides an example of secondary link discovery at a WTRU following directional signal strength measuring and reporting. WTRU1 250 may communicate with mB 252 over a direct LoS link with receive beam 253a and transmit beam 253b. Alternatively, WTRU1 250 may communicate over a non-LoS link comprising receive beam 254a and transmit beam 254b which may have been established based on the directional signal strength measurements. Communication between WTRU2 251 and mB 252 over a direct LoS link with receive beam 255a and transmit beam 255b may remain undisturbed.

mB controlled directional measurements for generating a DREM and determining WTRU location may also involve sending extra data in beacon frames. FIG. 2G shows an example of a Directional Measurement frame, which may contain a directional measurement request 263 field, a directional measurement report 273 field, and a beam switch 282 field.

The directional measurement request 263 field may include but is not limited to the following information: a start time 261, measurement interval 262, measurement count 264, start azimuth 265, start elevation 266, azimuth step 267, elevation step 268, and measurement control 269.

The directional measurement report 273 field shown in FIG. 2G may include but is not limited to the following information: azimuth 271, elevation 272, received channel power indicator (RCPI)/received signal to noise indicator (RSNI) 274, and Rx antenna gain 275.

The beam switch 282 field shown in FIG. 2G may include but is not limited to the following information: switch trigger 281, azimuth offset 283, elevation offset 284, traffic specification (TSPEC)/QoS specification 285, signal strength loss 286, switch time 287, switch control 288, handover (HO) address 289, and HO parameters 290.

As stated above the directional measurement request 263 field includes a start time 261 timestamp, which may define the exact time of the frame. This start time 261 timestamp may also be used to calculate the Round Trip Time (RTT) after the acknowledgement (ACK) is sent back. By obtaining the RTT, the location of a WTRU may be identified independently from the directional signal strength measurements reported by the WTRU by calculating the distance traveled by the beacon to reach the WTRU. Calculating the distance traveled by the beacon to reach the WTRU using Time of Arrival (ToA) or Time Difference of Arrival (TDoA) may also be performed when system clocks are synchronized. The accuracy of the WTRU's position may be improved by calculating the distance of the WTRU from more than one mB.

The WTRU may receive periodic beacons from a mB as shown in the example of FIG. 2G. The WTRU may then synchronize its internal clock based on the received start time 261 timestamp. The WTRU may then respond to the mB with a control message containing the exact transmission instant of the WTRU response. From the timestamp received from the WTRU, the mB may estimate the range of the WTRU using time-of-flight calculations. Based on the range estimate and other received information, the mB may determine the best beam to use for communicating with the WTRU. The mB may also transmit the range estimate to the WTRU.

The WTRU may respond with its timing response upon receiving the beacon or some other message from the mB with a timestamp to avoid timing errors due to clock drift. For an mB with multiple associated WTRUs, a schedule for collecting WTRU timing responses may be established by the mB, and should shortly follow the beacon transmissions.

Figure 3B:
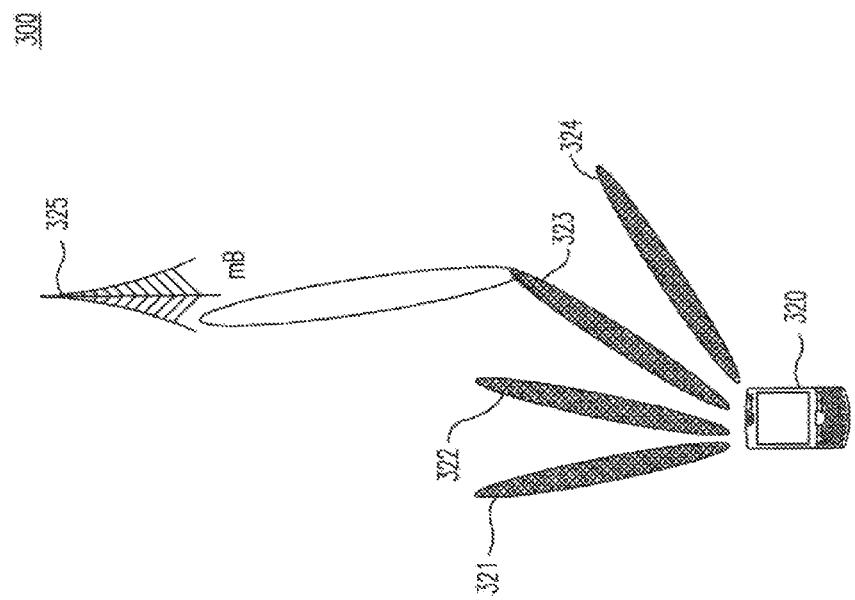
FIG. 3B is a second example of using data from other sources for tracking the movement of a WTRU to generate a DREM.
Figure 3A:
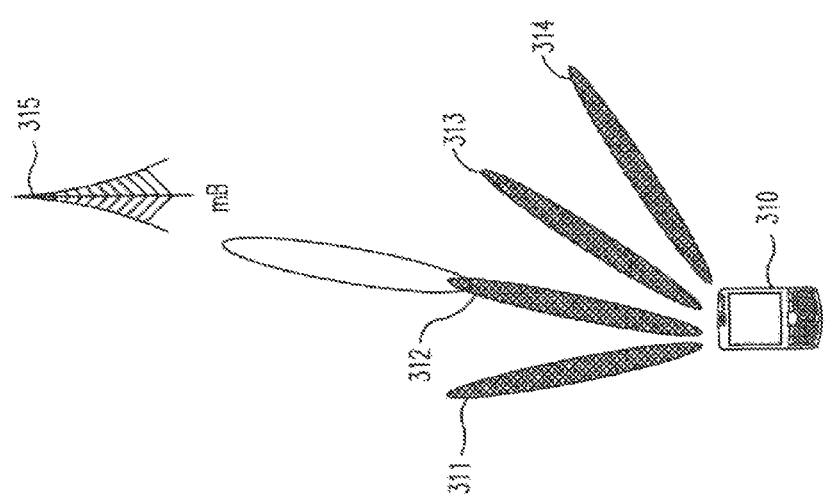
FIG. 3A is an example of using data from other sources for tracking the movement of a WTRU to generate a DREM.

FIGS. 3A-3B provide examples of using data from other sources for tracking the movement of a WTRU to generate a DREM and perform beam tracking 300. In FIG. 3A, the WTRU 310 may have a communication link with mB 315 using beam 312, but WTRU 310 may also know the signal strengths of beams 311, 313, and 314. This information may be used to determine which beam would be the best to use in the event that the orientation data of WTRU 310 changes.

In FIG. 3B, it is shown that once the orientation data of WTRU 320 may have changed, the WTRU 320 may start using beam 323 to sustain the communication link with mB 325. After the beam has been adjusted, WTRU 320 may contact mB 325 to notify mB 325 that because the orientation of WTRU 320 has changed, beam 323 may be used in case beam 322 is no longer strong enough to sustain the communication link. Consequently, mB 325 may update the current beam orientation and DREM associated with WTRU 320. If WTRU 320 changes orientation drastically a different mB may be used to continue the connection. Alternatively or additionally, WTRU 320 and mB 325 may feed back the alternative beam 323 to an eNB, either through the overlaying LTE connection or a viable mmW link.

WTRU 320 may use various methods to determine and report its movement and/or changed orientation to the mB 325. One approach is for the WTRU 320 to use internal compass signals. Additionally, the orientation change signaled by the internal sensors may be used by WTRU 320 to maintain its beam orientation towards mB 325, by modifying its beam configuration to use alternative beam 323.

In another example, GPS coordinates may be used to track the movement of WTRU 320. Coordinates may be obtained using GPS, Assisted-GPS (A-GPS) or the like. This method may reduce the resources used for beam acquisition and training because the location of WTRU 320 may be established within a smaller range as the mB filters the directional signal strength measurements received based on the GPS coordinates or time information. GPS is a space-based satellite navigation system that provides location and time information in all weather and anywhere on or near the Earth where there may be an unobstructed line of sight to four or more GPS satellites. Using these coordinates may enable the identification of the position of WTRU 320 with the accuracy of 10 meters or less. This may be used by mB 325 in order to perform a beam training procedure within a particular area (of a 10 meter radius) rather than the wider range. After mmW links are formed regular feedback may be sent with the position of WTRU 320 according to the GPS coordinates to mB 325 and additionally to the eNB. For efficiency, WTRU 320 may report only the change in readings from the previous instance. Using this information, a prediction may be made as to which direction WTRU 320 may be moving and with what speed, narrowing the possibilities of beams that may be used to make a link, which may enable mB 325 to determine the best beam 323 for communicating with WTRU 320.

Another approach for performing beam tracking of WTRU 320 may include the use of other devices internal to WTRU 320 such as by using a gyroscope/accelerometer. A gyroscope is a device that may be used for measuring orientation using angular momentum, thereby allowing it to maintain the orientation. A gyroscope may comprise a spinning wheel or disk in which the axle is free to assume any orientation. This orientation, which is not fixed, may keep changing in response to an external torque much less and in a different direction than it would without the large angular momentum associated with the disk's high rate of spin and moment of inertia. When the device is mounted on gimbals, external torque is minimized, but its orientation remains nearly fixed, regardless of any motion of the platform on which it is mounted. Because gyroscopes allow the calculation of orientation and rotation designers have incorporated them into many devices. The integration of the gyroscope has allowed for more accurate recognition of movement within a 3D space than previous methods using a lone accelerometer within a number of smart phones. A further recent innovation is an electronic gyroscope, which is present in vehicles like Segway scooters and the Honda UNI-CUB, which ensures that the vehicle remains upright and balanced.

WTRU 320 may have an integrated gyroscope, accelerometer, compass and other orientation sensing devices. Outputs from such internal sensors may be fed back to mB 325 to facilitate beam tracking. These readings, when available with high precision, along with other information, may enable mB 325 to determine the precise location and orientation of WTRU 320. For efficiency, WTRU 320 may report only the change in readings from the previous instance. These devices may also be used advantageously by measuring the signal strength readings from the beacons, such that whatever position WTRU 320 is in WTRU 320 remains in contact with the strongest beam.

Group movement of WTRUs may also be tracked using the methods described above. This situation may apply when multiple WTRUs move together in the same direction, for example, in a vehicle. The WTRU tracking may be aided in such a situation because multiple measurements covering several WTRUs may be leveraged for WTRU location estimation. A collection of WTRUs covered by the same or adjoining mB beams constitute a group. Members of a group maintain a constant spatial relation with respect to each other, which facilitates efficient tracking. This enhancement may manifest itself in several ways including but not limited to the following: the mB may reduce WTRU tracking measurements by denoting one or a few of the WTRUs in the group, identifying one or more of the WTRUs as a group head or heads and using those measurements for the entire group, or it may manifest itself in the form of a denser sampling of WTRU tracking measurements leading to better location prediction.

For tracking purposes, a group may comprise of WTRUs sharing the same mB beam. A feature of a group may include that the members maintain a constant spatial relation with respect to each other, which facilitates efficient tracking.

This may allow group members to reduce their location reporting periodicity. The WTRUs may be informed of group membership or may infer group membership using methods including but not limited to the following: the mB may inform the WTRU about group membership and a lower location reporting periodicity, or the WTRU may determine group membership via monitoring location information of other WTRUs reported via OBand signaling. In the second case, the WTRU may infer that it is part of a group when it finds other WTRUs with similar coordinates, and may automatically reduce its position reporting periodicity.

Figure 4A:
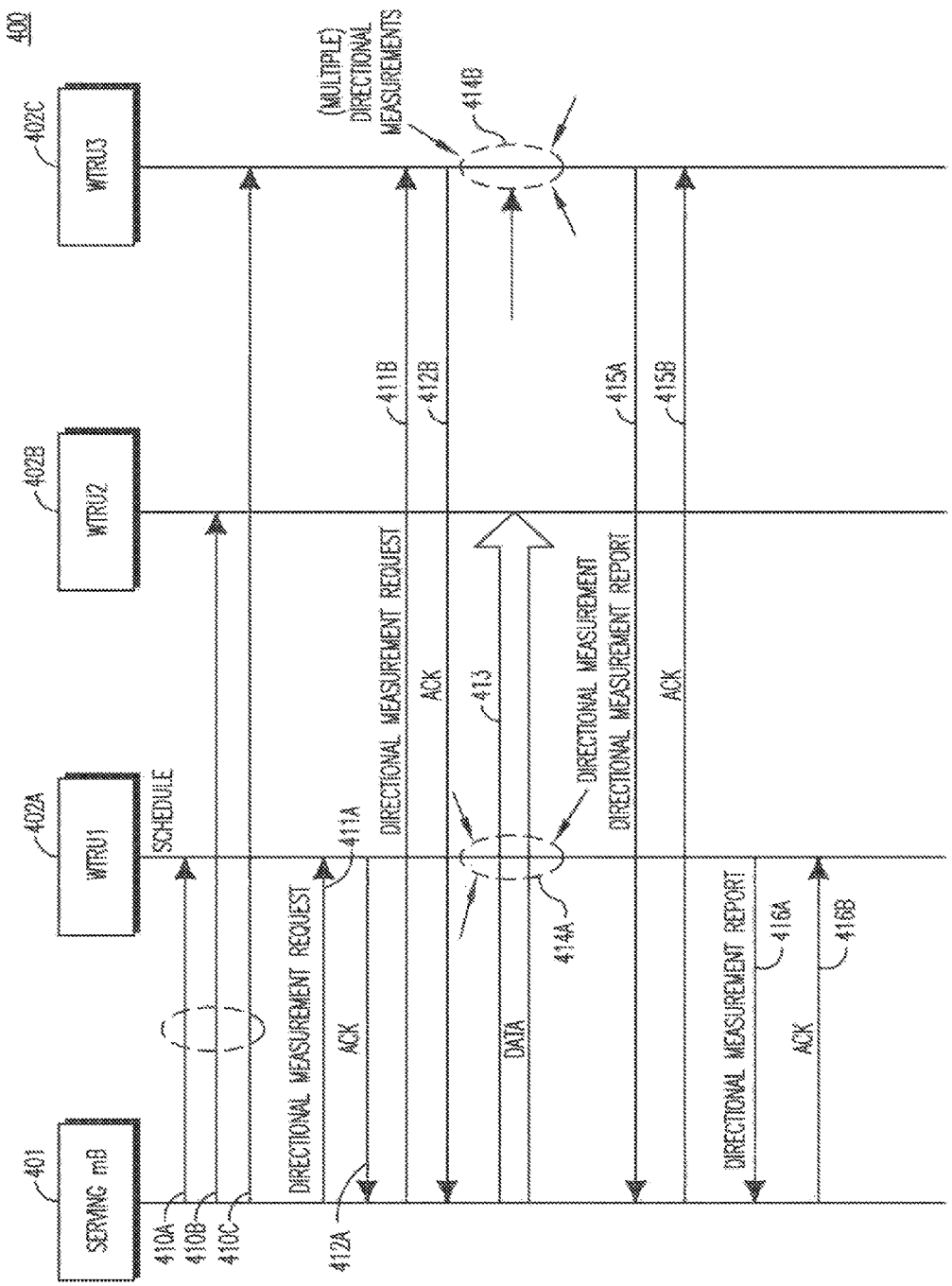
FIG. 4A is a call flow diagram for an example intra cell/basic service set (BSS) directional measurement procedure for DREM generation.

FIG. 4A is a call flow diagram for an example intra cell/basic service set (BSS) directional measurement procedure for DREM generation 400. Serving mB 401 may transmit a measurement schedule 410a, 410b, and 410c to WTRU1 402a, WTRU2 402b, and WTRU3 402c respectively. The schedule may be transmitted in a beacon frame as described above. Serving mB 401 may then transmit directional measurement request 411a to WTRU1 402a and directional measurement request 411b to WTRU3 402c. WTRU1 402a and WTRU3 402c may respond by transmitting ACK 412a and 412b respectively to serving mB 401. Then while serving mB 401 is transmitting data 413 to WTRU2 402b, WTRU1 402a and WTRU3 402c may make directional measurements 414a and 414b. WTRU3 402c may then transmit a directional measurement report 415a to serving mB 401, which transmits an ACK 415b back to WTRU3 402c in response. Similarly WTRU1 402a may then transmit directional measurement report 416a to serving mB 401, which transmits an ACK 416b back to WTRU1 402a in response.

Figure 4B:
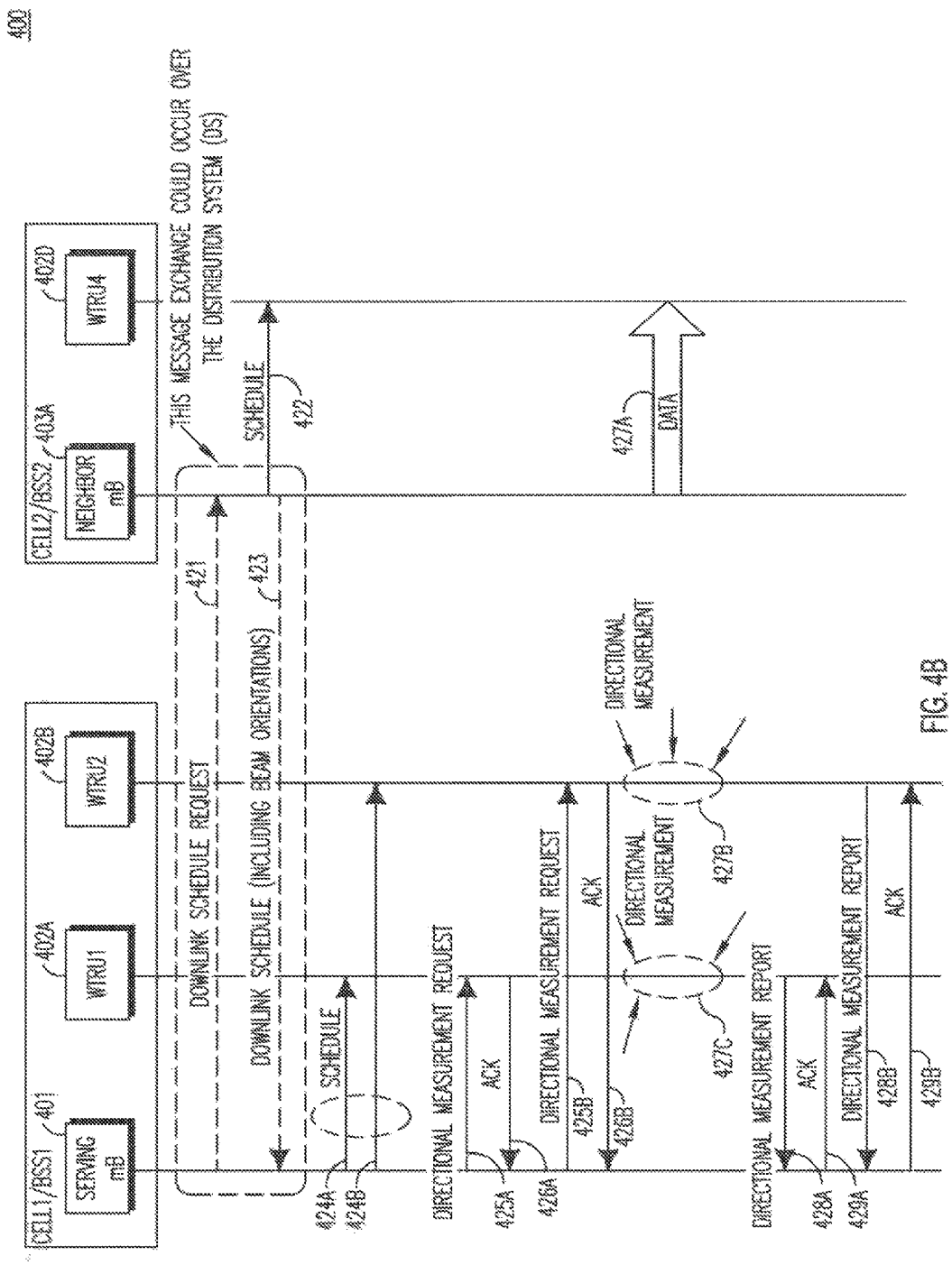
FIG. 4B is a call flow diagram for an example inter cell/basic service set (BSS) directional measurement procedure for DREM generation.

FIG. 4B is a call flow diagram for an example inter cell/basic service set (BSS) directional measurement procedure for DREM generation. Serving mB 401 may transmit a downlink schedule request 421 to neighbor mB 403a. Neighbor mB 403a may then transmit a measurement schedule 422 to WTRU4 402d. Then neighbor mB 403a may transmit a downlink schedule request 423 to serving mB 401, which may include beam orientations. Serving 401 mB may then transmit a measurement schedule 424a to WTRU1 402a and transmit a measurement schedule 424b to WTRU2 402b. Serving mB 401 may then transmit directional measurement request 425a to WTRU1 402a and directional measurement request 425b to WTRU2 402b. WTRU1 402a and WTRU2 402b may respond by transmitting ACK 426a and 426b to serving mB 401. Then while neighbor mB 403a is transmitting data 427a to WTRU4 402d, WTRU1 402a and WTRU2 402b may make directional measurements 427b and 427c. WTRU1 402a may then transmit directional measurement report 428a to serving mB 401, which may transmit an ACK 429a back to WTRU1 402a. Similarly WTRU2 402b may then transmit a directional measurement report 428b to serving mB 401, which transmits an ACK 429b back to WTRU2 402b in response.

Figure 5:
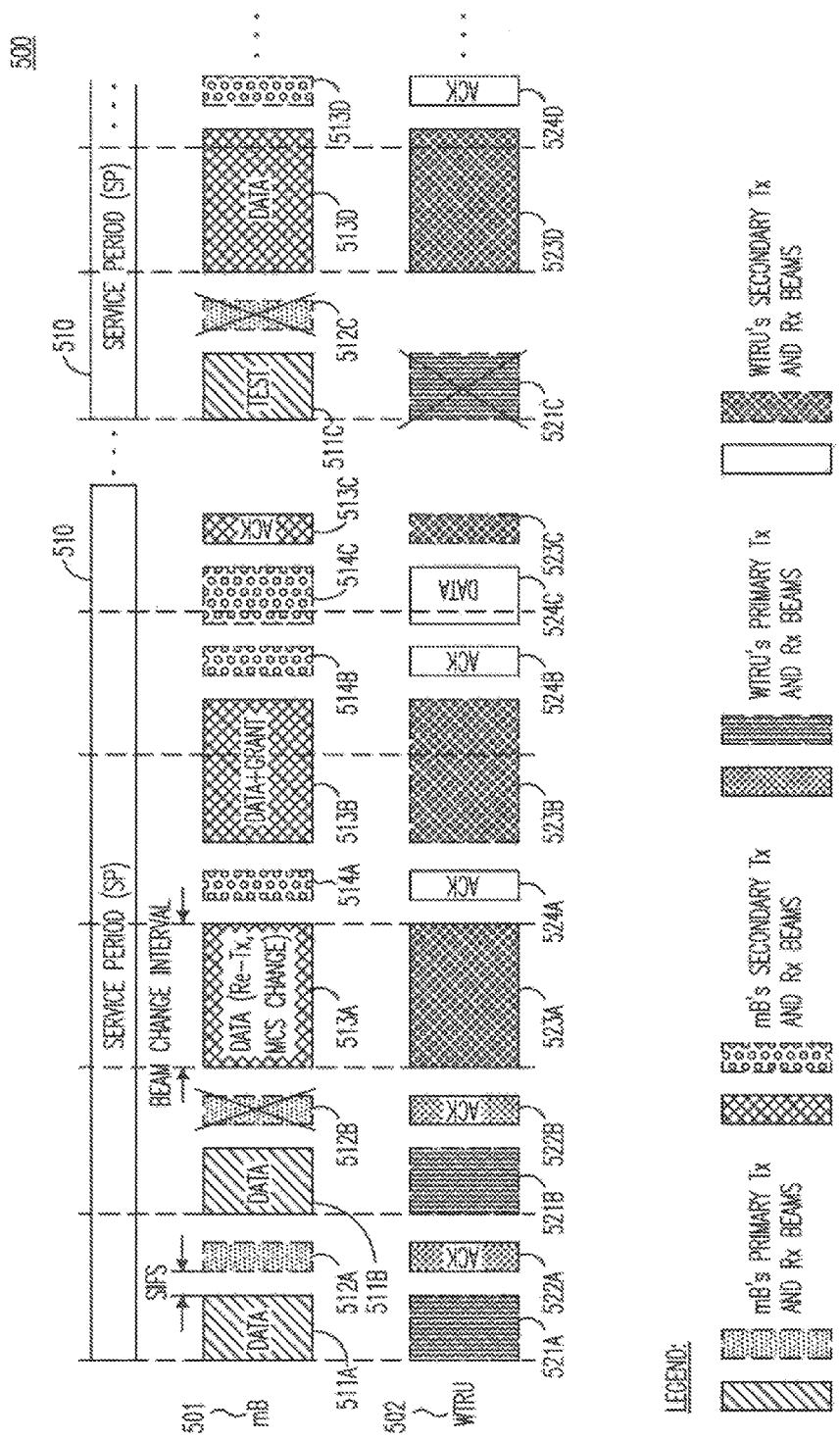
FIG. 5 is an example of secondary beam activation.

As aforementioned, once an mB has generated a DREM in accordance with any of the methods described herein, the mB may identify secondary beams for use by a WTRU. FIG. 5 provides an example of secondary beam activation 500. FIG. 5 shows the use of DREM to identify a secondary beam during service period 510. In this example, mB 501 may transmit data on its primary transmission (Tx) beam 511a and 511b and may not receive on its primary reception (Rx) beam 512a and 512b while WTRU 502 may be transmitting ACKs on its primary Tx beam 522a and 522b and may be receiving data on its primary Rx beam 521a and 521b. When the primary Rx beam 512b of mB is blocked, mB 501 switches to a secondary beam as identified using DREM and may continue to transmit data on secondary Tx beam 513a, 513b, and 513c. mB 501 may receive on secondary Rx beam 514a, 514b, and 514c. Similarly, WTRU 502 is transmitting on its secondary Tx beam 524a, 524b, and 524c and receives on its secondary Rx beam 523a, 523b, and 523c.

mB 501 may then test the primary Tx beam 511c, which may result in WTRU 502 having its primary Rx beam 521c blocked and mB 501 having its primary Rx beam 512c blocked. As a result mB 501 and WTRU 502 may continue communicating on their respective secondary beams: mB 501 transmits on its secondary Tx beam 513d and secondary Rx beam 513e while WTRU 502 transmits on its secondary Tx beam 523d and secondary Rx beam 524d.

Figure 6A:
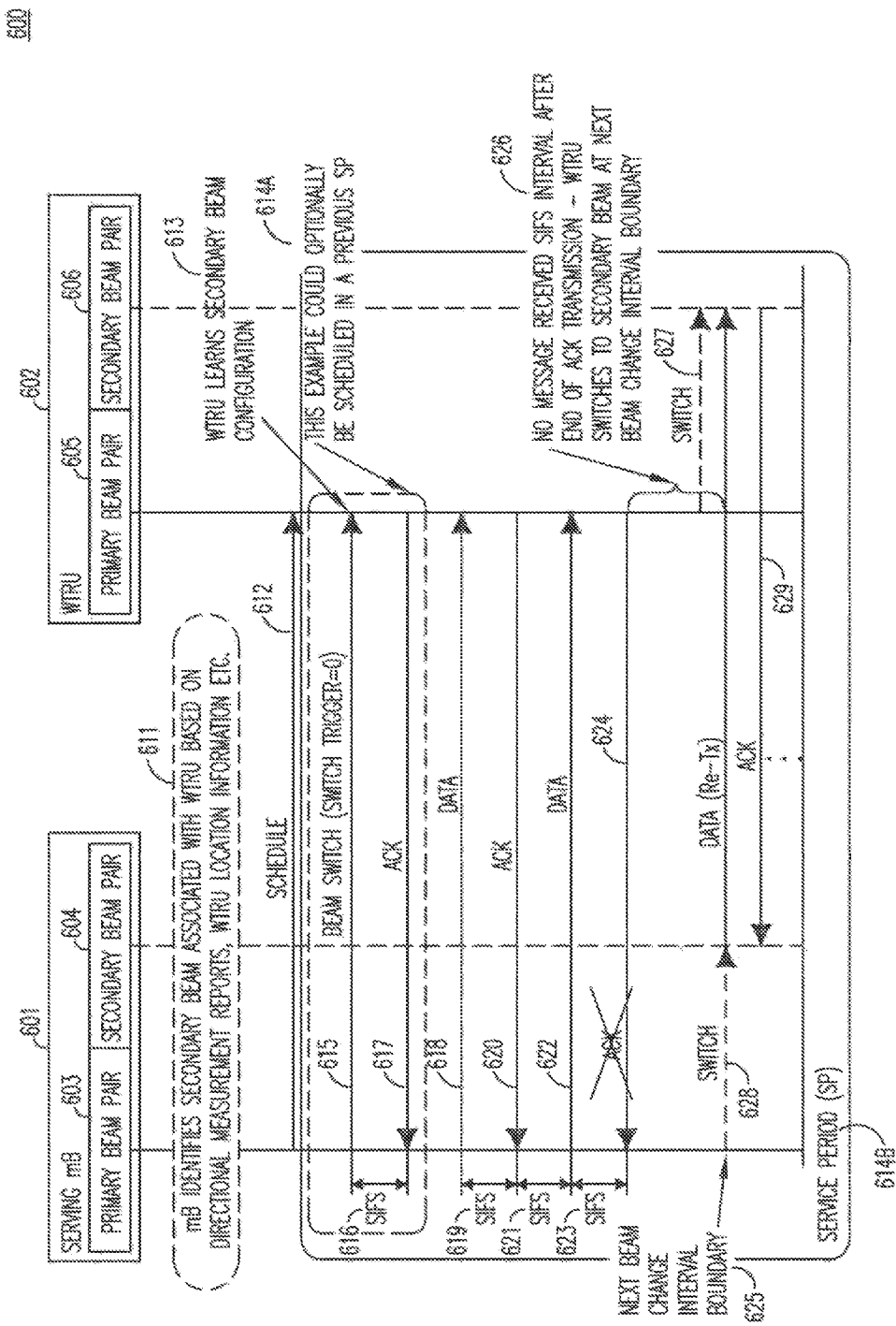
FIG. 6A is an example call flow of a procedure in which an implicit intra-cell switch is made to a secondary beam.

FIG. 6A shows an example call flow of a procedure in which an implicit intra-cell switch is made to a secondary beam 600. Serving mB 601 may identify a secondary beam 611 associated with WTRU 602 based on DREM which includes but is not limited to directional measurement reports, WTRU location information, and/or WTRU orientation based on any of the methods described herein. While communicating on a primary beam 603, the serving mB 601 may transmit a schedule 612 to WTRU 602 on its primary beam 605, and WTRU 602 may be notified of the secondary beam configuration 613. Serving mB 601 may then send a beam switch 615 to WTRU 602 over their respective primary beams 603 and 605. Within a short interframe space (SIFS) 616, WTRU 602 may respond with an ACK 617. Serving mB 601 may then transmit data 618 to WTRU 602. Again, within a SIFS 619, WTRU 602 may respond with an ACK 620. Following SIFS 621, serving mB 601 may transmit data 622 to WTRU 602. WTRU 602 may then respond with an ACK 624, which is blocked and not received by serving mB 601 during SIFS 623. As a result WTRU 602 may switch to a secondary beam 626, and serving mB 601 may also switch to a secondary beam 628 following a beam change interval 625. Serving mB 601 may then retransmit data 627 to WTRU 602 on their respective secondary beams 604 and 606. WTRU 602 may then respond with an ACK 629. This procedure may occur within a service period (SP) 614b or within more than one SP such as a previous SP 614a.

Figure 6B:
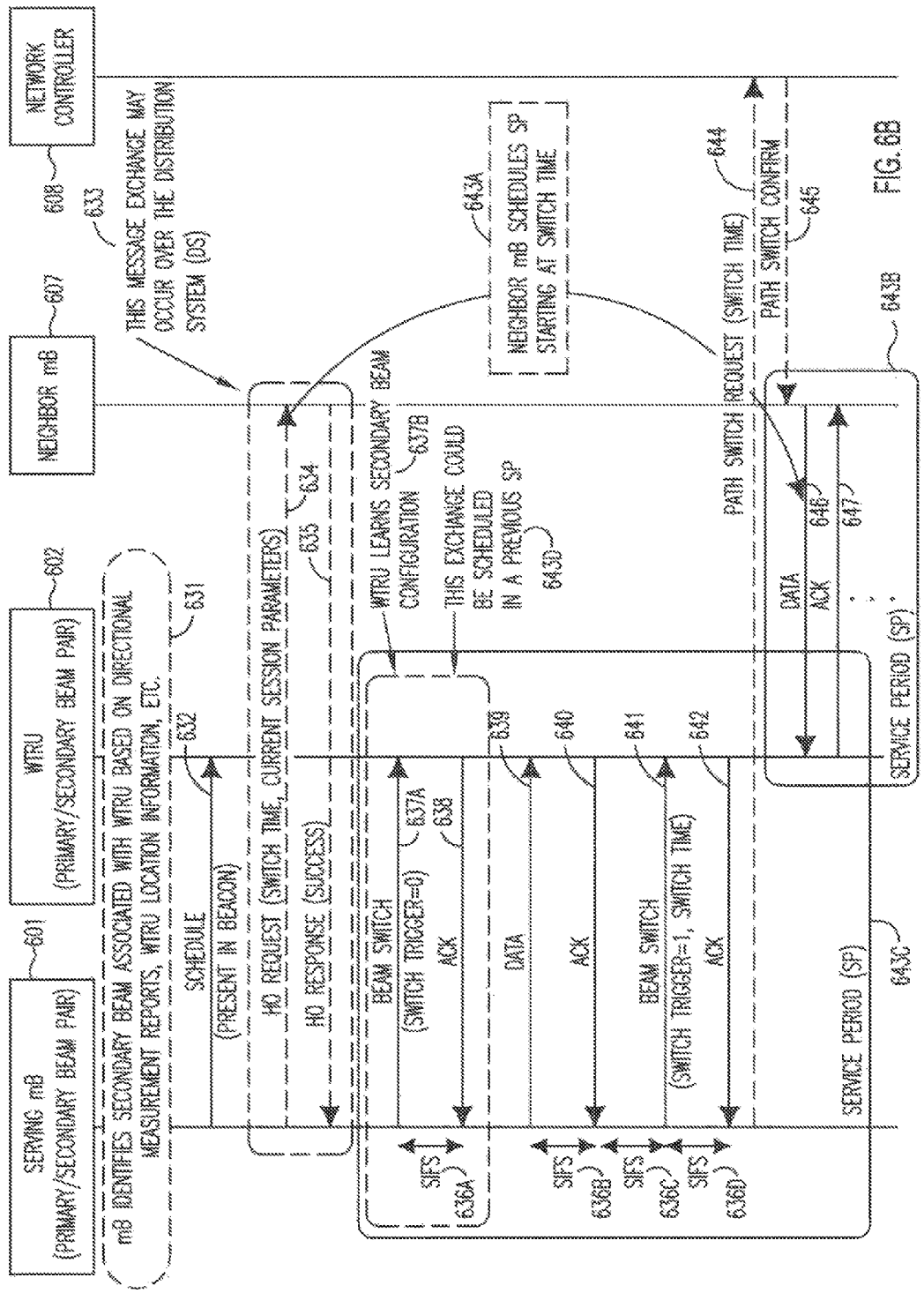
FIG. 6B is an example call flow of a procedure in which an explicit inter-cell switch is made to a secondary beam.

FIG. 6B shows an example call flow of a procedure in which an explicit inter-cell switch is made to a secondary beam. Serving mB 601 may identify a secondary beam 631 associated with WTRU 602 based on DREM which includes but is not limited to directional measurement reports, WTRU location information, and/or WTRU orientation based on any of the methods described herein. While communicating on a primary beam, the serving mB 601 may transmit a schedule 632 to WTRU 602. Serving mB 601 may then transmit a handover (HO) request 634 to a neighbor mB 607, and the neighbor mB may respond with a HO response 635 indicating success. The HO request 634 and HO response 635 exchange may occur over the distribution system (DS) 633. Serving mB 601 may then send a beam switch 637a to WTRU 602, and WTRU 602 may learn of the secondary beam configuration 637b. Within a short interframe space (SIFS) 636a, WTRU 602 may respond with an ACK 638. Serving mB 601 may then transmit data 639 to WTRU 602. Again, within a SIFS 636b, WTRU 602 may respond with an ACK 640. Following SIFS 636c, serving mB 601 may transmit a beam switch 641 to WTRU 602, which may respond with ACK 642. Serving mB 601 may then transmit a path switch request 644 to a network controller 608, and the network controller 608 may respond with a path switch confirmation 645. Then neighbor mB 607 may transmit data 646 to WTRU 602 on a secondary beam, and WTRU 602 may respond with an ACK 647. The message exchange as detailed herein may occur within the same SP 643c or within more than one SP 643b such as a previous SP 643d. The message exchange between neighbor mB 602 and WTRU 602 may occur within a separate SP 643a.

FIG. 7A shows an example in which an mB has two beams and may select a beam based on WTRU movement 700. The directional signal strength measurements and location and orientation information fed back by WTRU 702 in accordance with any of the methods described herein may enhance the tracking performance at the mB 701. mB 701 may combine any of the aforementioned information reported by the WTRU 702 to estimate the position of WTRU 702 with high accuracy. The information may be used by mB 701 to choose the appropriate beam from its two beams 703 and 704 which provide overlapping coverage. In this example the WTRU location uncertainty region 705 is smaller than the beam 703 coverage and 704 respectively. Based on the illustrated WTRU 702 location estimate, mB 701 may switch from beam 703 to beam 704 for the next data transmission. Location based beam tracking may also be used in examples where there is no overlapping coverage between adjoining beams.

FIG. 7B shows an example of how location information may be used for improved handover decisions. Again, the directional signal strength measurements and location and orientation information fed back by WTRU 712 in accordance with any of the methods described herein may enhance the tracking performance at the mB1 711 and mB2 713, which may provide overlapping coverage as in this example. Also in this example, the location uncertainty region 716 of WTRU 712 is smaller than the beam coverage provided by 714 and 715. Initially, mB1 711 may be the serving mB. Based on the WTRU 712 location estimate and knowledge of adjacent beam coverage based on for example the DREM, mB1 711 may determine that handover of WTRU 712 to mB2 713 may be needed. Location based handover decisions may also be used in examples where there is no overlapping coverage between adjoining beams.

In addition to the directional signal strength measurements and location and orientation information fed back by a WTRU historical data may also be used for WTRU tracking and may allow logical predictions to be made as to the direction that a WTRU may move. FIG. 8 shows an example in which a WTRU may be tracked using historical data 800. WTRU 801 may be currently communicating with mB 803 using beam 805, while moving in the direction shown 802. At the current position, beam 805 may be determined to be in fact the strongest and thereby, the optimal beam to use. However, information including the corresponding beam strengths of beams 804, 806, and 807 may also be present. The direction in which WTRU 801 is moving may be calculated using the differences among the beam strengths of beams 804, 806, and 807 and the rate in which the beam strengths change. This calculation may further be improved by using other factors like timestamps, GPS data, gyroscope measurements, and the like using any of the methods described herein. Historical data may be maintained in a database such as a DREM database. This database may contain data such as for example, recent history of beams used (according to mB and beam ID) by WTRU 801, history of the terrain in which mB 803 is deployed, previous history of similar movements of WTRU 801, and any related historical information pertaining to the nearest neighboring mBs of mB 803. Terrain information in which mB 803 is deployed and the terrain of neighboring cells may further narrow down predictions as it may reduce the number of attempts for a beam training procedure to be performed because the possible paths of movement by WTRU 801 are known. This database may be constantly updated using information received from WTRU 801. mB 803 may also store the route in which WTRU 801 is moving in a database. Storing and retrieving such historical data may enable mB 803 to predict the movement of WTRU 801 allowing mB 803 to track WTRU 801 more accurately. By retrieving recent history of previous beams stored in the database of mB 803, a more accurate prediction may be made to determine the position of WTRU 802.

By using any of the tracking techniques disclosed herein and/or historical data, mB 803 may more efficiently handover the signal to a new mB because mB 803 may be able to determine the closest mB to which WTRU 801 is moving. When the WTRU reaches the edge of the cell, it is able to listen or communicate with multiple mBs. mB 803 may then handover the signal to a new mB by immediately informing the eNB in the network and the new mB the details of the movement of WTRU 802.

Figure 9:
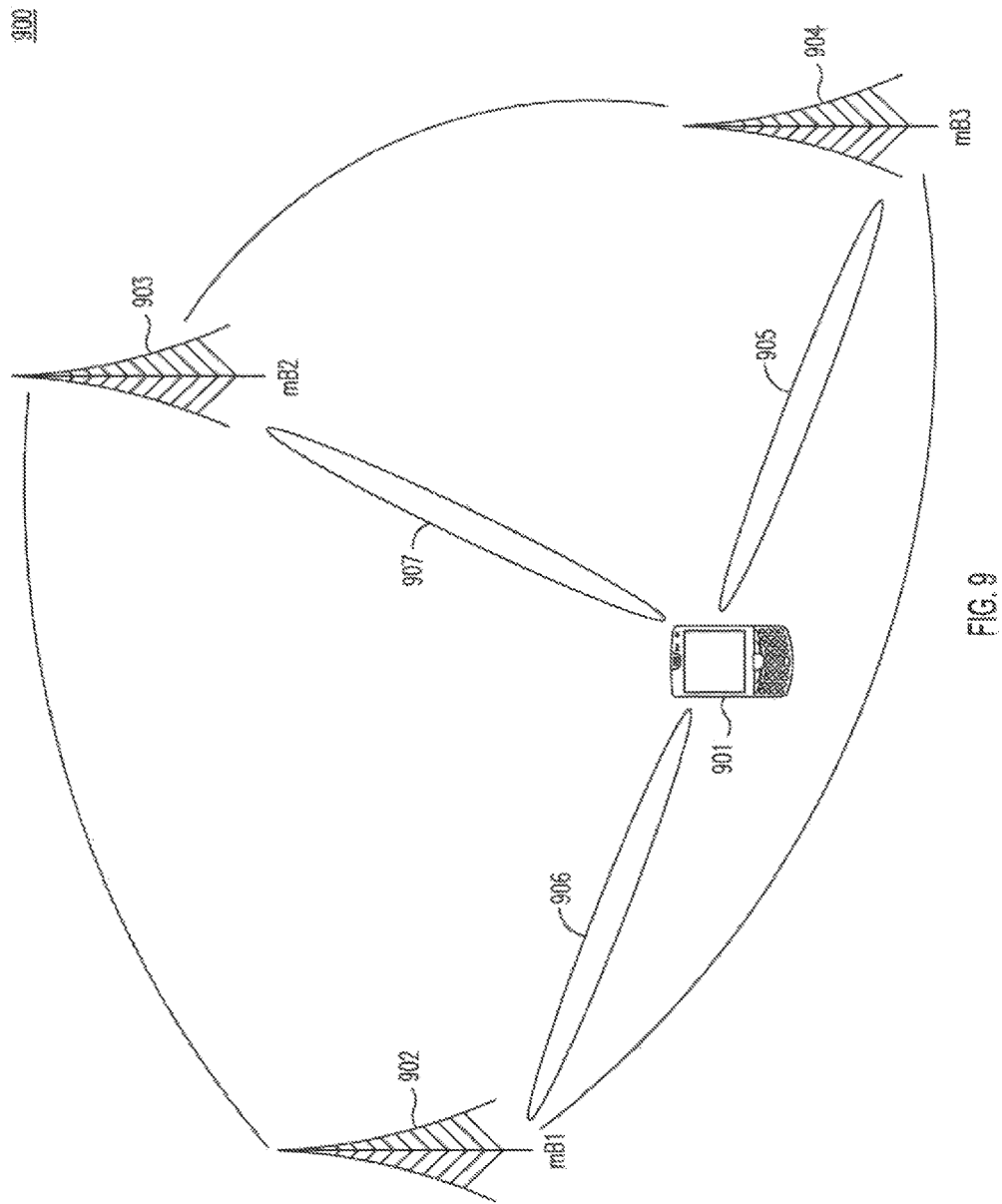
FIG. 9 is an example in which a WTRU may be tracked by multiple mBs.

FIG. 9 shows an example in which a WTRU may be tracked by multiple mBs 900. In this example, WTRU 901 may be at all times situated in between mB1 902, mB2 903, and mB3 904. When WTRU 901 is within listening distance of mB1 902, mB2 903, and mB3 904 as shown by their respective beams 906, 907, and 905. mB1 902, mB2 903, and mB3 904 may use tracking information to locate the position of WTRU 901 by performing any of the methods described herein. By using multiple mBs, the WTRU may be tracked with improved precision or accuracy using method such as a triangulation technique.

Data tracked by mB2 903 and mB3 904 may be fed back to mB1 902 when mB 902 is the serving mB. This may allow mB1 902 to know the details tracked by mB2 903 and mB3 904 from WTRU 901. For example, by getting the distances of WTRU 901 from mB2 903 and mB3 904, the exact location of WTRU 901 may be determined. The data fed back to mB1 902 may be of any form such as, for example, GPS co-ordinates, gyroscope/accelerometer measurements or other mB's measurements namely, power, time taken, distance, and the like and may be provided in accordance with any of the methods described herein.

According to yet another embodiment, mB1 902, mB2 903, and mB3 904 may belong to a group, which for example may be called Group mBs. Coordinated beam tracking between multiple mBs, mB1 902, mB2 903, and mB3 904 may also enable mBs as a group to identify an optimal beam to communicate with WTRU 901 or to identify an alternative beam when a current link fails. This method may also include a logical controller, which can either be co-located or not with one of the mBs in the group.

The Group mBs may share the location of WTRU 901 and orientation information of WTRU 901 with a controller. In the case of simultaneous association of WTRU 901 with multiple mBs, each mB reports the location of WTRU 901 and orientation information of WTRU 901 to the controller. The controller then determines the best beam to communicate with mB1 902, mB2 903, or mB3 904. If the controller determines that the best beam belongs to an mB that is different than the current serving mB, then it informs the serving mB to command the WTRU to switch to another Group mB once the current message exchange is complete. The reported data to the neighbor mB may include any of the location or orientation related information listed herein.

Figure 10A:
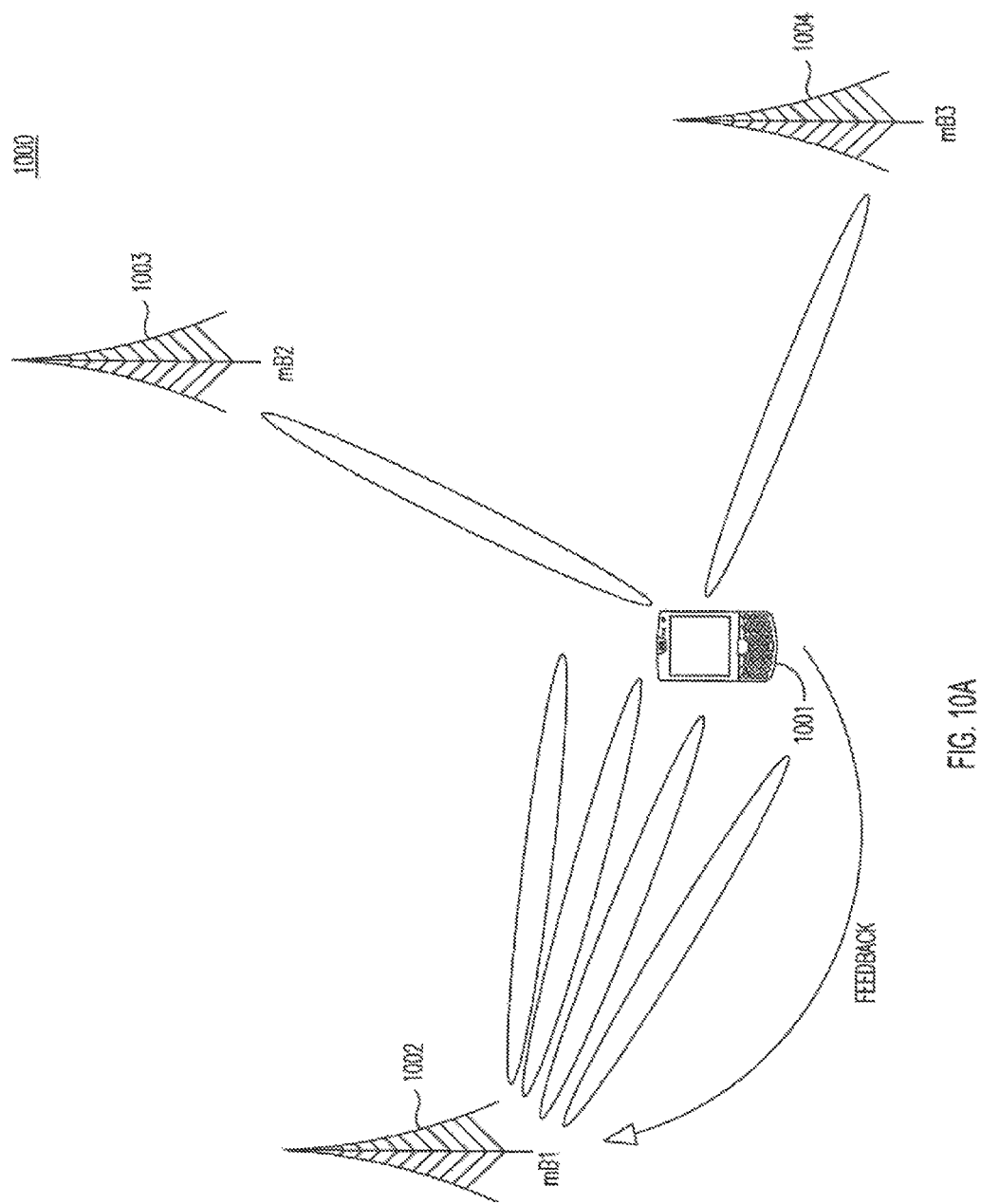
FIG. 10A an example of a WTRU providing data feedback from multiple mBs to the serving mB.

FIG. 10A shows an example of a WTRU providing data feedback from multiple mBs to the serving mB for multiple mB-aided tracking in accordance with yet another embodiment 1000. In this example, WTRU 1001 may get attached to serving mB1 1002 by performing a beam acquisition procedure and determining the strongest possible mmW link. The serving mB1 1002 may request WTRU 1001 perform signal strength measurements on signals originating in other networks. These networks may be operating either in the same frequency channel as serving mB 1002 or another channel. In either case a measurement gap may be configured by serving mB 1002 allow WTRU 1001 to perform measurement procedures that may occur when WTRU 1001 switches channels or receives beam direction for signal measurements. By setting up a measurement gap, serving mB 1002 may ensure that no data transmissions are scheduled for WTRU 1001 during the measuring interval.

In-band measurements may also be used. WTRU 1001 may be directed by serving mB 1002 to report directional signal strength measurements for signals received from the neighboring mBs such as mB2 1003 and mB3 1004. In case of an IEEE 802.11ad system, WTRU 1001 may be directed to report RSSI of directional beacons from the neighboring mB2 1003 and mB3 1004. In some embodiments, WTRU 1001 may measure the beacon strength of neighboring mB2 1003 and mB3 1004 with an omni or quasi-omni antenna pattern. Alternatively, WTRU 1001 may measure the beacon strength using a beam directed towards neighboring mB2 1003 and mB3 1004. This may require successful completion of a beam training procedure at WTRU 1001, via Responder-Receive Sector Sweep (R-RXSS) procedure, to identify optimum receive antenna pattern. If the report of WTRU 1001 also includes the antenna pattern used for signal measurements, then serving mB 1002 may estimate the absolute range of WTRU 1001 from neighboring mB2 1003 and mB3 1004. If the receive antenna configuration information is not included in the report of WTRU 1001, then serving mB 1002 may estimate relative WTRU 1001 displacement by comparing successive signal strength reports.

Out-of-band measurements may also be used. Serving mB 1002 may request WTRU 1001 make signal strength measurements in a different frequency channel, either within the same band or different. Additionally, serving mB 1002 may provide other information such as mB identifiers in other channels and their coordinates. Serving mB 1002 may also establish a measurement gap for WTRU 1001 making signal strength measurements on a different frequency channel.

Alternatively or additionally, WTRU 1001 may report the beam identifiers of neighboring mB2 1003 and mB3 1004 corresponding to strongest beacon reception. In general, neighboring mB2 1003 and mB3 1004 may include the transmit beam identifier in the transmitted beacon, and this may be reported by WTRU 1001 to the serving mB 1002 if the packet is successfully decoded.

During the measurement gap, WTRU 1001 may listen to the neighboring mBs such as mB2 1003 and mB3 1004 and receive information from mB2 1003 and mB3 1004. WTRU 1001 may then perform calculations and measurements. The WTRU may then feed all of these details back to serving mB1 1002, which may then analyze the received information, perform calculations, and determine the exact position of WTRU 1001.

Reference signaling with respect to multiple mB-aided WTRU tracking may also be used. A reference signal may be defined as one that is sent between two entities exclusively in order to measure or estimate the mmW link quality. A triangulation method or any of the other methods described herein may be applied. This reference signal may be include but is not limited to the following:

1) A known sequence—this signal may be solely sent for the purpose of calculating the power of the signal at arrival;

2) A time-stamp—this signal may have a timestamp attached to it to calculate the time taken by either RTT, ToA or TDoA to determine position; or 3) Beam+mB identifier—this signal may have details about which beam was sent from which mB so that a ranking system may be established as to which one was the strongest.

FIG. 10B shows an example of mB to mB communication signaling in accordance with another embodiment. This method involves the direct communication of data from the neighboring mB2 1013 to the connected mB 1012. In this process, WTRU 1011 initially may get attached to serving mB1 1012 by performing a beam acquisition procedure and determining the strongest possible mmW link. Serving mB1 1012 may configure a measurement gap and allow WTRU 1011 to perform measurement procedures. During the measurement gap, WTRU 1011 may listen to the neighboring mBs such as mB2 1013 and mB3 1014 and receive information from mB2 1013 and mB3 1014. WTRU 1011 may then perform calculations and measurements. The WTRU may then feed all of these details back to mB2 1013. mB2 1013 may either reports these details back to mB1 1012 in raw form or may analyze the received information, perform calculations and send processed information to allow mB1 1012 to determine the position of WTRU 1011.

WTRU 1011 may also provide feedback to neighbor mB 1013. Under some conditions WTRU 1011 may want to convey its changed location or orientation information to its serving mB1 1012 earlier than its next service period (SP), and when no contention-based access period (CBAP) is available before its next SP. Then WTRU 1011 may send its location or orientation information to neighbor mB2 1013, with which it is simultaneously associated. Simultaneous association as used herein may refer to any kind of multiple association, such as temporary association, association for control signaling only, and the like. In this case, data transmissions may still occur through serving mB1 1012, but WTRU 1011 communicates with neighbor mB2 1013 for measurement reports and other control messaging. Neighbor mB2 1013 may forward the received information to the serving mB1 1012 of WTRU 1011 either through the distribution system (DS) or via a direct link between mB1 1012 and mB2 1013, if one is available. This may allow the serving mB1 1012 of WTRU 1011 to proactively adjust its beam towards the WTRU for the next transmission. This allows the serving mB1 1012 to react to rapid movement by WTRU 1011 between two successive measurement report transmissions, which may result in loss of the serving mB1 1012-WTRU 1011 link when the neighbor mB 1013-WTRU 1011 link may still be operational. This may also enable WTRU 1011 to make better handover decisions to neighbor mB2 1013 and mB3 1014. The reported quantities to neighbor mB2 1013 may include any of the location or orientation related information described herein.

Initial beam training optimization is also described herein in accordance with yet another embodiment. The current IEEE 802.11ad beam training procedure specifies quasi-omni reception at the responder/STA for device discovery, followed by beamforming training involving signal strength measurements on multiple candidate beams to arrive at the optimum pair of transmit and receive beams at the initiator/

AP and responder/STA. The beamforming training procedure may be simplified with location and orientation information as described herein.

Figure 11A:
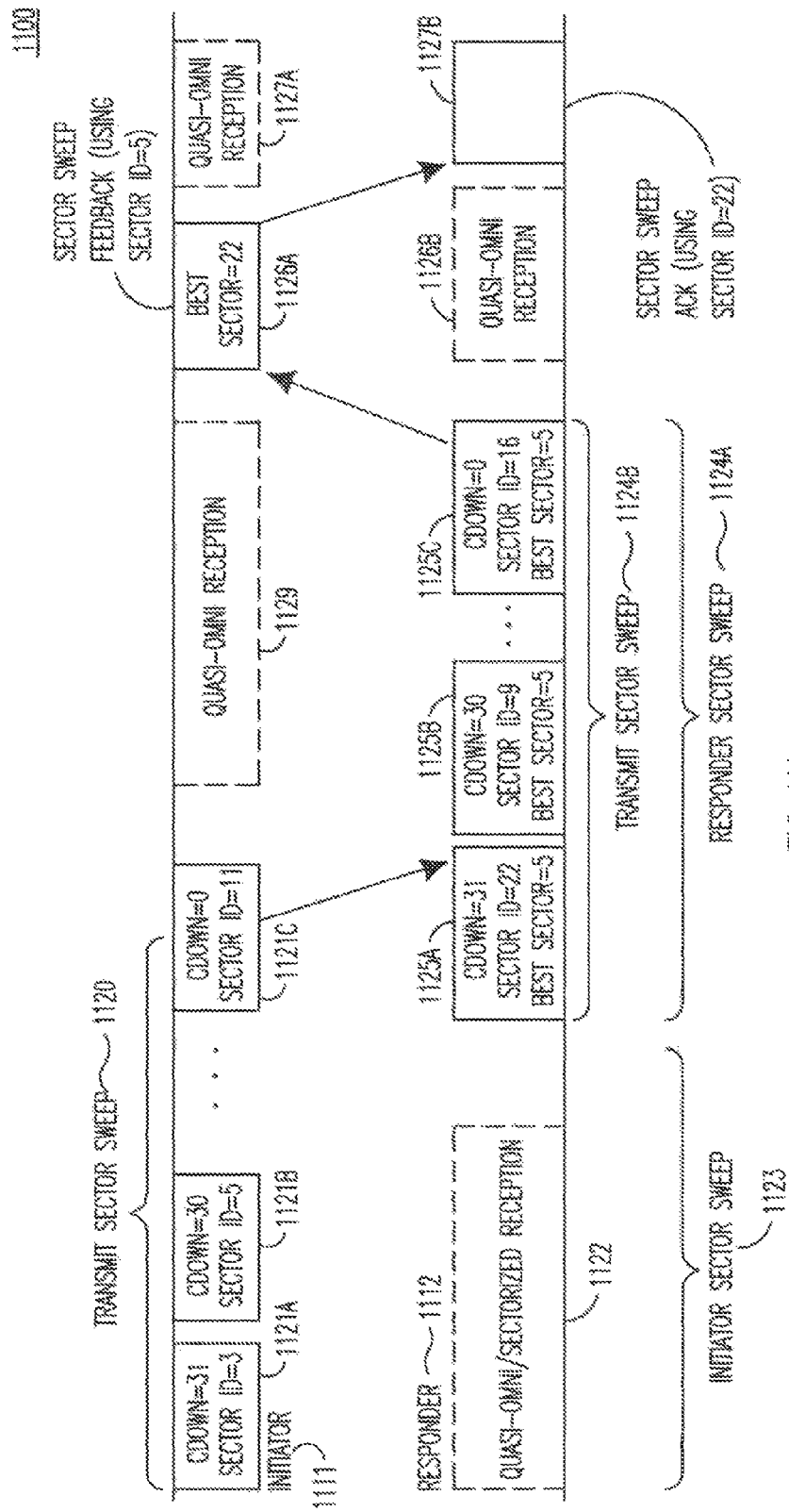
FIG. 11A is an example of the current IEEE 802.11ad Sector Level Sweep (SLS) procedure.

FIG. 11A shows an example of the current IEEE 802.11ad Sector Level Sweep (SLS) procedure 1100. At the end of the SLS procedure, the initiator 1111 and the responder 1112 normally identify their best transmit sectors by exchanging sector sweep frames. The procedure begins with the initiator 1111 (personal basic service set (PBSS) control point/access point (PCP/AP)) transmitting sector sweep frames 1120 or beacons in multiple directions with a sectorized antenna pattern, while the responder 1112 (STA) receives with a quasi-omni antenna pattern 1122. Each of these messages 1121*a*, 1121*b*, and 1121*c* contains a unique countdown field and a sector identifier. This phase is called Initiator Sector Sweep (ISS) 1123. This is followed by the Responder Sector Sweep (RSS) 1124*a* that normally consists of the Receive Sector Sweep (RXSS), called Responder-Receive Sector Sweep (R-RXSS). In this phase, the responder transmits multiple sector sweep 1124*b* frames in different directions using sectorized antenna patterns, while the initiator receives with a quasi-omni antenna pattern 1129. Each sector sweep frame 1125*a*, 1125*b*, and 1125*c* transmitted by the responder contains unique countdown and sector identifier fields, and also the initiator's best sector identifier. Therefore, at the end of the SLS procedure, the initiator and responder identify their optimal transmit sectors 1126*a* while receiving with a quasi-omni antenna pattern 1126*b* and 1127*a*.

Figure 11B:
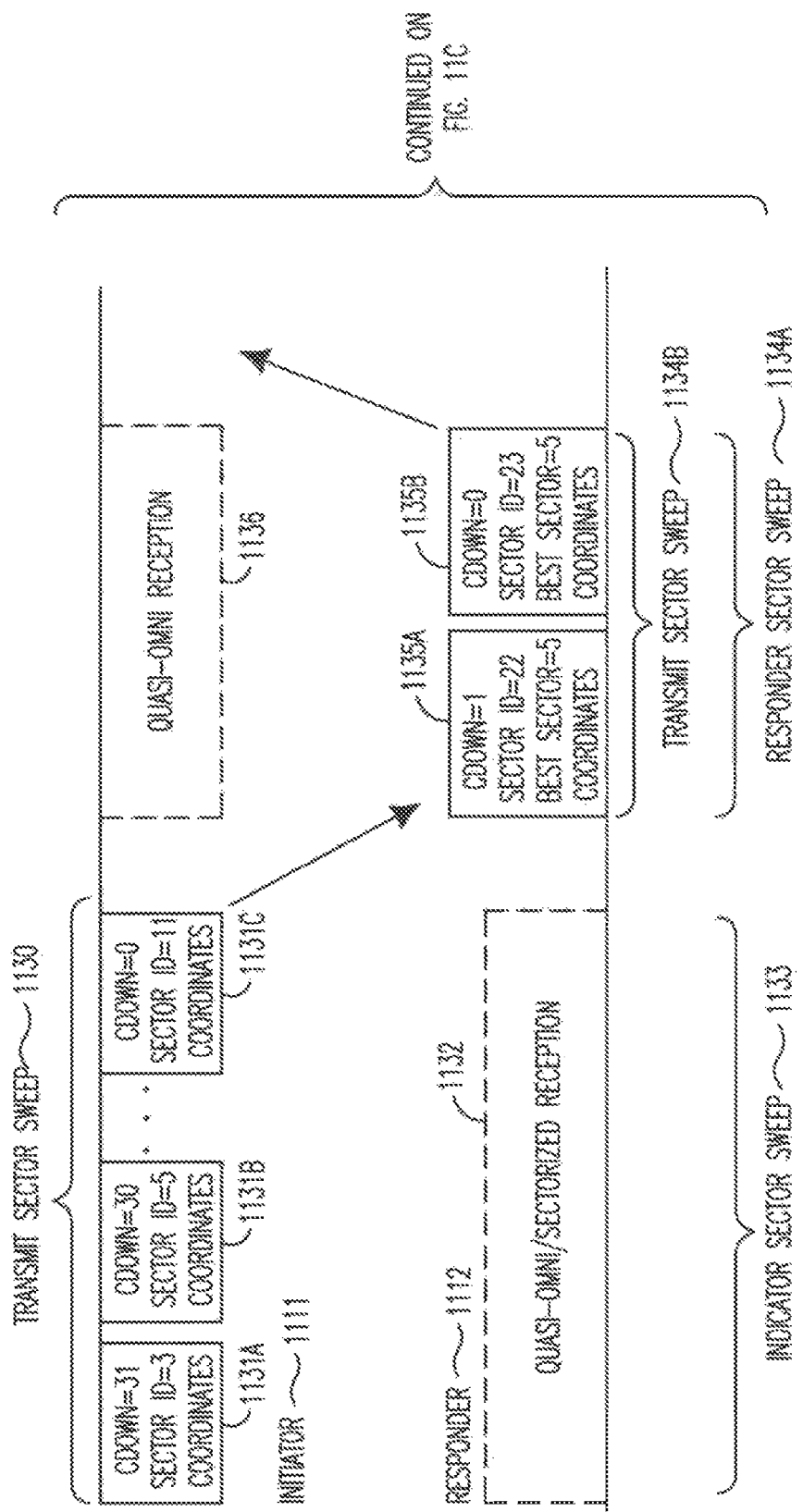
FIG. 11B is an example of a revised SLS procedure.
Figure 11C:
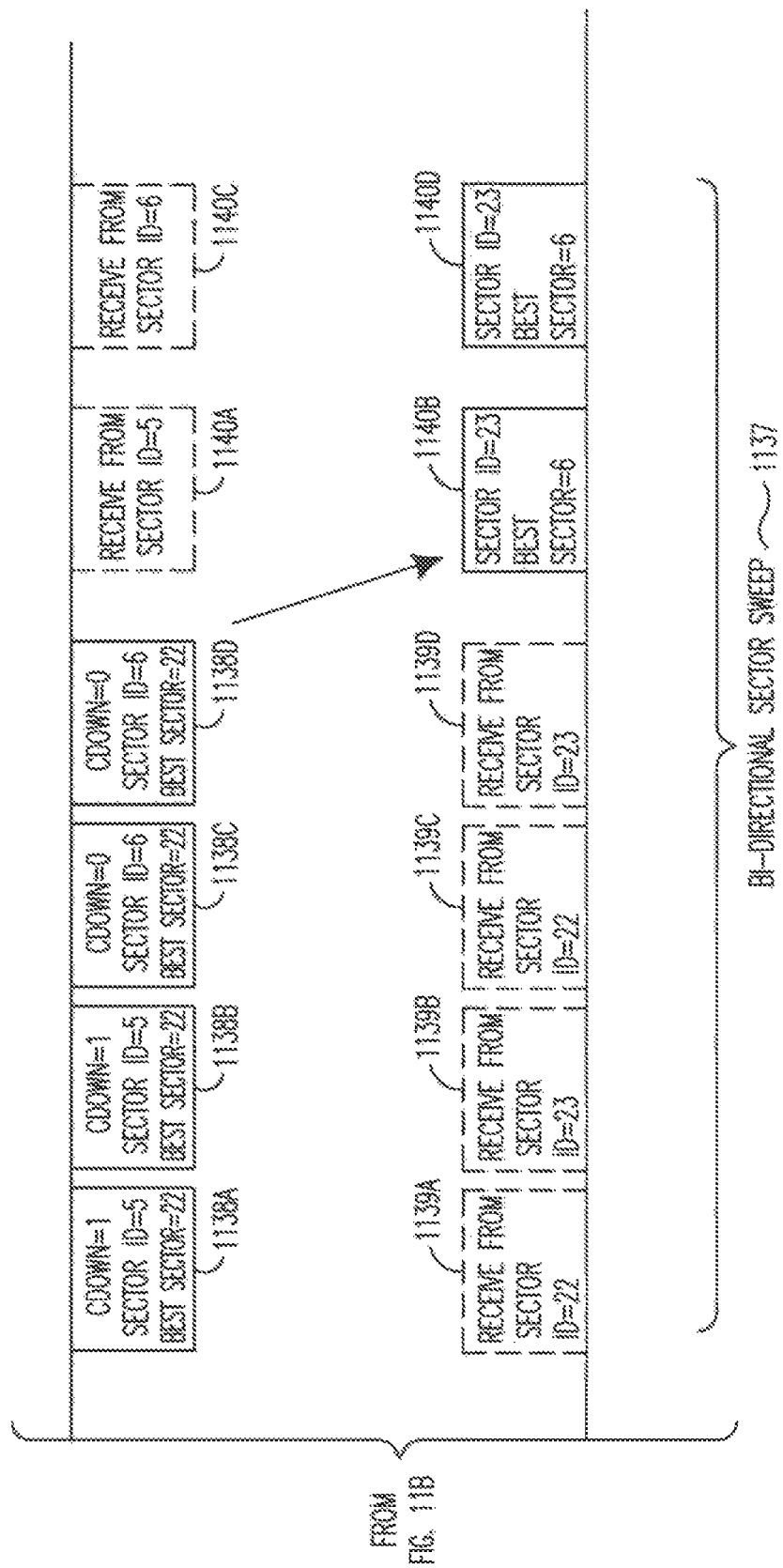
FIG. 11C is a continuation of the example revised SLS procedure of FIG. 11B.

FIG. 11B shows an example of a revised SLS procedure in accordance with yet another embodiment. In this procedure nodes exchange their coordinates leading to discovery of optimum transmit and receive sectors at the initiator and the responder. The nodes, initiator 1111 and responder 1112, may identify their coordinates with high accuracy using any of the procedures described herein. The accuracy of the location information naturally affects the performance and the time required to converge to the optimum sectors, but the procedure is flexible enough to accommodate different input accuracy levels. Moreover, the described procedure is backward compatible with IEEE 802.11ad SLS procedure, such that legacy devices are also accommodated.

The first phase, ISS 1133, begins with the initiator 1111 transmitting multiple sector sweep 1130 frames or beacons in different directions. However, the initiator now may include its precise coordinates in the transmitted frames 1131*a*, 1131*b*, and 1131*c* while the responder 1112 may receive with a quasi-omni antenna pattern 1132. Legacy devices that receive one of the transmitted frames may discard the coordinate information and proceed normally to the next phase.

The second SLS phase, RSS 1134*a*, may use the location information transmitted by the initiator 1111. Now, any responder 1112 that is able to successfully decode one of the sector sweep or beacon frames, 1131*a*, 1131*b*, and 1131*c*, may identify the precise coordinates of the initiator 1111. Based on the knowledge of its own location, previously acquired by any of the options described earlier, the responder 1112 may determine the optimum sector to use for sector sweep frame transmission. Depending on the accuracy of the location information, the responder may identify one optimum sector or a set of candidate sectors to try out in the second phase. It then may transmit the sector sweep 1134*b* frames 1135*a* and 1135*b* through the identified sectors while the initiator 1111 may modify the countdown field to reflect the number of transmit sectors under test. The responder 1112 may also include its own coordinates in all the transmissions. During this time the initiator 1111 may receive with a quasi-omni antenna pattern 1136. In the case of a response received from a legacy device, the initiator 1111 may proceed to the next stage according to the standardized procedure. If however, the received response contains the coordinate field, the initiator 1111 may switch to the modified third phase as described below.

At the end of the second phase (RSS), the initiator 1111 may also learn the coordinates of the responder 1112 and may switch to transmit mode to transmit sector sweep frames 1138*a*, 1138*b*, 1138*c*, 1138*d* through a small set of transmit sectors, identified based on the coordinates of the initiator 1111 and the responder 1112. In the first sub-phase, the initiator 1111 may transmit sector sweep frames 1138*a*, 1138*b*, 1138*c*, 1138*d* through some sectors while the responder 1112 may receive through its receive sectors 1139*a*, 1139*b*, 1139*c*, and 1139*d* that were identified earlier, at the end of ISS. At the end of this sub-phase, the responder 1112 may also be able to uniquely identify the optimum sector. Then the responder 1112 may transmit sector sweep frames 1140*b* and 1140*d* through the optimum sector while the initiator 1111 may receive through its identified sectors 1140*a* and 1140*c*. At the end of this sub-phase, the initiator 1111 also may identify the optimum sector. Therefore, both nodes may be able to identify optimum sectors, aided by location information. By having an mB include location information, a WTRU may get additional location and directional information of the mB. Furthermore, because the WTRU may include its location information in the procedure described herein, the mB may estimate the location of the WTRU more accurately. These sectors may be used as starting points for fine beam training in the Beam Refinement Protocol (BRP) procedure. If the initiator 1111 determines that it may not finish the modified SLS procedure in the current Association-Beam Forming Training (A-BFT) period, then the procedure may be split into multiple A-BFT periods or the remaining steps completed in a SP or CBAP.

Figure 12:
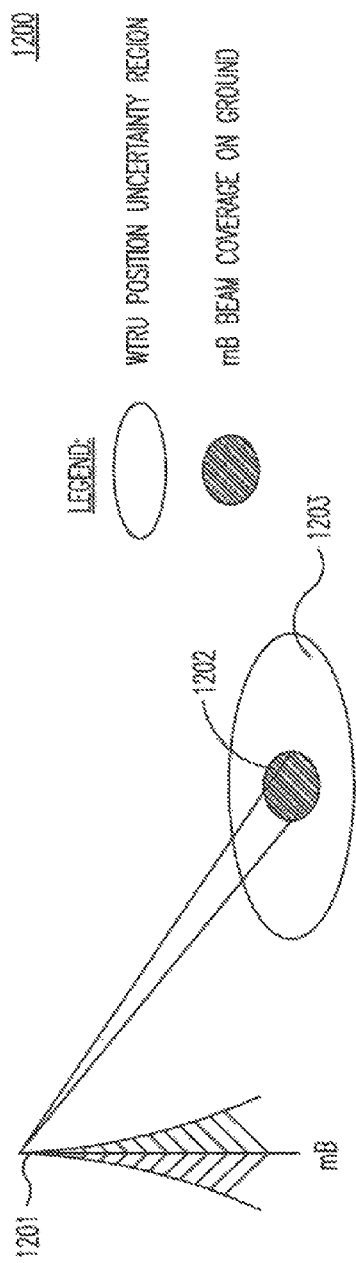
FIG. 12 is an example of improved method for geo-location precision.

FIG. 12 shows an example of improved method for geo-location precision 1200. mB 1201 may improve geo-location precision by using beam tagging. A WTRU's location may be estimated using GPS or related technologies as described using any of the methods described herein. However, there may be error in some of these calculations due to factors including but not limited to environmental conditions, such as the terrain in dense urban areas. To mitigate any estimation errors, mB 1201 may create a narrow beam that illuminates a small area with radio waves using a highly directional antenna. The area covered by a directional beam 1202 may be smaller than the uncertainty region 1203 of a localization technique such as GPS or any of the other methods described herein, especially when the WTRU is close to mB 1201. This method may be used to correct localization errors and refine such estimates.

In this method, mB 1201 may continuously collect the reported coordinates of associated WTRUs over a period of time. The WTRU then may filter the reported coordinates according to the associated beams. By time-averaging the reported coordinates of WTRUs served by a particular beam, mB 1201 may estimate the precise coordinates of the centroid of the area illuminated by the beam 1202 on the ground. Therefore, by collecting the coordinates of WTRUs associated with different beams, mB 1201 may precisely estimate the coordinates associated with each beam, i.e., mB 1201 may tag each beam with a GPS coordinate. The coordinates associated with a beam may be transmitted to a WTRU using that beam to improve its location estimate. This may improve the handover performance of the WTRU, due to an improved location estimate. Additionally, mB 1201 may supply location information to WTRUs that lack secondary localization capabilities such as GPS. Such low-capability devices may take advantage of location estimates supplied by serving mB 1201 for improved beam-tracking and better handover performance.

Figure 13:
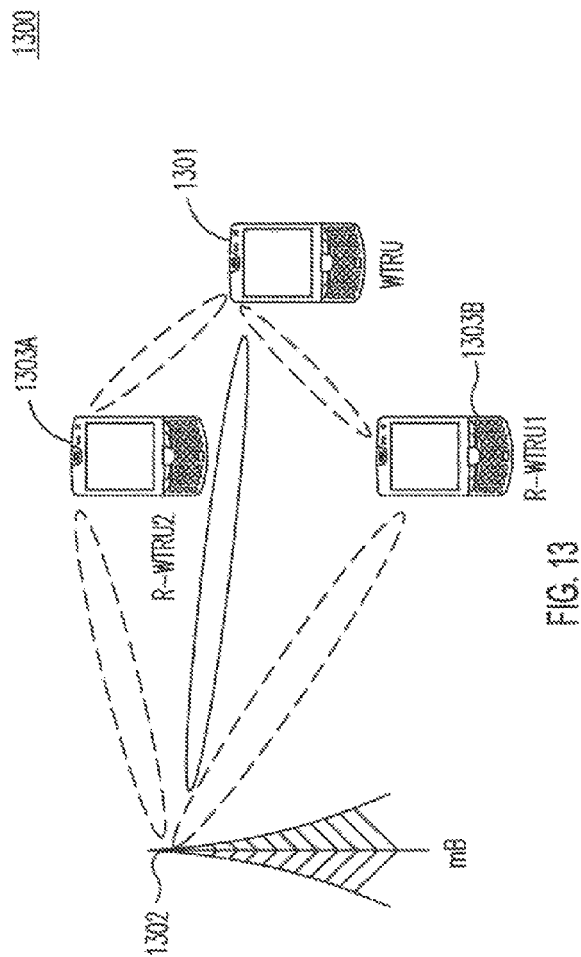
FIG. 13 is an example of direct and indirect mB-WTRU links.

Beam tracking methods for indirect links may be performed in accordance with yet another embodiment. Beam tracking via in-band signaling is one technique described herein. FIG. 13 shows an example of direct and indirect mB-WTRU links 1300. WTRU 1301 has a direct communication link with mB 1302 and also indirect links to mB 1302 via Relay WTRUs, R-WTRU1 1303b and R-WTRU2 1303a. R-WTRU1 1303b and R-WTRU2 1303a may perform beam tracking on the WTRU 1301-R-WTRU1 1303b link and WTRU 1301-R-WTRU2 1303a link. R-WTRU1 1303b and R-WTRU2 1303a may perform beam tracking for the relay link without direct communication with the WTRU.

In one method in accordance with this embodiment, WTRU 1301 may report its location information to serving mB 1302. These reports may be sent periodically, may be trigger-based, or may be sent in response to mB 1302 requests. Location information of WTRU 1301 may be used by mB 1302 to update the associated beam. Additionally, location information of WTRU 1301 may be sent to R-WTRU1 1303b and R-WTRU2 1303a that may be registered with mB 1302 as relays for WTRU 1301. Based on location information of WTRU 1301 received from mB 1302, R-WTRU1 1303b and R-WTRU2 1303a may update their respective beams to point towards WTRU 1301. Additionally, location information supplied by R-WTRU1 1303b and R-WTRU2 1303a may be forwarded by mB 1302 to WTRU 1301, so that WTRU 1301 may maintain appropriate beams for relay links. In accordance with any of the location-related feedback methods described herein, the beam orientation relative to a global reference may also be transmitted by WTRU 1301, R-WTRU1 1303b and R-WTRU2 1303a, or mB 1302 to enable tracking in the other link. For example, beam orientation for the direct link, (such as orientation with respect to geographic North), may be transmitted by WTRU 1301 to mB 1302 and this may be forwarded to R-WTRU1 1303b and R-WTRU2 1303a to assist it in tracking WTRU 1301. Similar feedback from R-WTRU1 1303b and R-WTRU2 1303a to assist WTRU 1301 may also possible.

Alternatively or additionally, mB 1302 may send test signals using different transmit beams and request WTRU 1301 to report signal strength measurements on the test signals. This may allow mB 1302 to identify the best beam to associate with a particular WTRU. mB 1302 may use a logical numbering scheme for its beams linked to geographical orientation, or some other commonly known basis. Upon receiving the feedback from WTRU 1301 about the best beam, mB 1302 may forward the optimum beam identifier to the active relays, R-WTRU1 1303b and R-WTRU2 1303a associated with WTRU 1301. From the reported mB 1302 beam identifier, R-WTRU1 1303b and R-WTRU2 1303a may estimate the relative position of WTRU 1301 and may accordingly adjust their beams associated with the relay link.

Figure 14A:
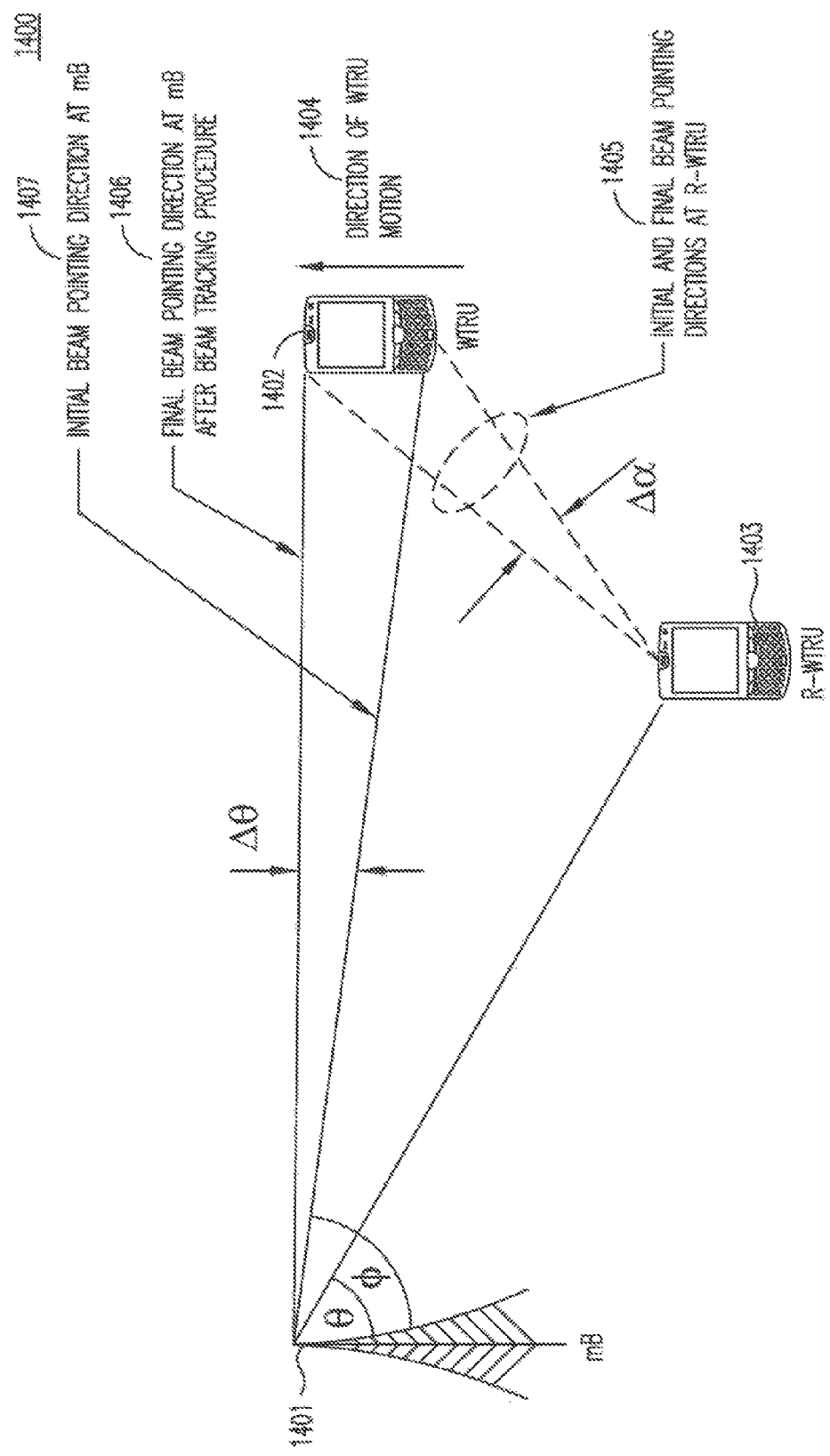
FIG. 14A is an example of beam tracking on the R-WTRU-WTRU link triggered by WTRU movement.

FIG. 14A shows an example of beam tracking on the R-WTRU-WTRU link triggered by WTRU movement 1400. When WTRU 1402 moves 1404, R-WTRU 1403 adjusts its beam pointing direction from the initial beam pointing direction to its final beam pointing direction 1405. Similarly, WTRU 1402 adjusts its beam pointing direction from the initial beam pointing direction 1407 to its final beam pointing direction 1406 with mB 1401. As shown in FIG. 14A, beam tracking on the WTRU 1402 to R-WTRU 1403 link is triggered by the WTRU 1402 motion.

Figure 14B:
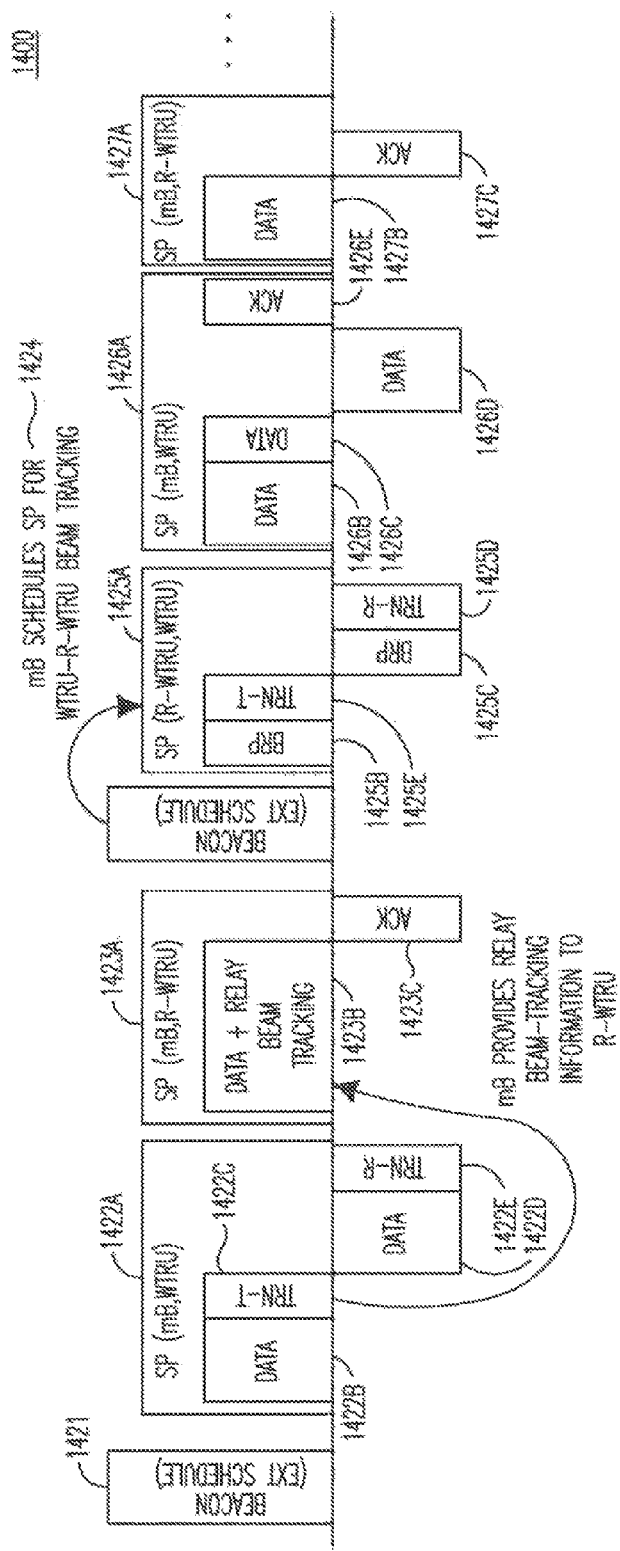
FIG. 14B is an example of how an mB may provide relay beam tracking information to a relay WTRU and may schedule a SP for WTRU-R-WTRU beam tracking.

FIG. 14B shows an example of how an mB may provide relay beam tracking information to a relay WTRU and may schedule a SP for WTRU-R-WTRU beam tracking. Following beacon 1421, data 1422b and 1422d and training (TRN) fields 1422c and 1422e may be sent between the mB and WTRU in SP 1422a. The mB may then provide relay and beam tracking information to the R-WTRU in 1423b followed by an ACK 1423c during SP 1423a.

The mB may then schedule an SP for WTRU-R-WTRU beam tracking 1424. Following beam refinement protocol (BRP) fields 1425b and 1425c and TRN fields 1425d and 1425e during SP 1425a, the WTRU and mB may transmit data 1426b, 1426c, and 1426d with a following ACK 1426e during SP 1426a. Similarly, during SP 1427a, the mB and R-WTRU may transmit data 1427b and a following ACK 1427c to provide beam tracking and correction information.

Figure 14C:
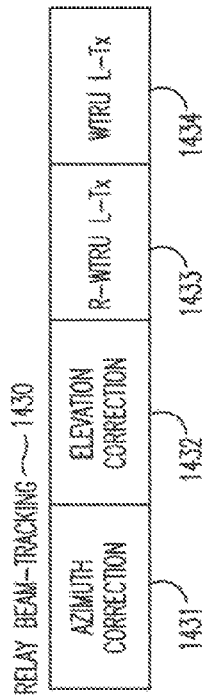
FIG. 14C is an example of a relay beam-tracking field that may be provided by the mB to the R-WTRU.

FIG. 14C shows an example of a relay beam-tracking field that may be provided by the mB to the R-WTRU. A relay beam-tracking field 1430 may include but is not limited to the following information: an azimuth correction 1431, elevation correction 1432, R-WTRU L-Tx 1433, and WTRU L-Tx 1434.

FIG. 15 shows an example of beam tracking via omni-directional band (OBand) signaling 1500. For example, in addition to communicating in the mmW band in accordance with any of the methods described herein, WTRU 1504, R-WTRU1 1505, R-WTRU2 1506, and mB 1503 may also simultaneously be connected in the mB's OBand coverage 1501 and the WTRU's OBand coverage 1502. Several methods for WTRU-RWTRU link beam tracking via OBand signaling are described herein as examples.

In a first method, WTRU 1504 may report its location information to serving mB 1503, via OBand signaling. These reports may be sent periodically, be trigger-based or sent in response to mB 1503 requests. WTRU 1504 location information may be used by mB 1503 to update the associated beam. Additionally, R-WTRU1 1505 and R-WTRU2 1506 within the OBand transmission range of WTRU 1504 may also obtain the location information, and adjust their associated beams to point towards WTRU 1504. Conversely, R-WTRU1 1505 and R-WTRU2 1506 may report their location information to serving mB 1503 using OBand signaling, and this may be simultaneously heard by WTRU 1504. Based on the received R-WTRU1 1505 and R-WTRU2 1506 location information, WTRU 1503 may modify its beam associated with R-WTRU1 1505 and R-WTRU2 1506.

Alternatively or additionally, mB 1503 may send test signals using different transmit beams and request WTRU 1504 to report signal strength measurements on the test signals via OBand signaling. This may allow mB 1503 to identify the best beam to associate with a WTRU 1504. mB 1503 may use a logical numbering scheme for its beams linked to geographical orientation, or some other commonly known basis. Upon receiving the feedback from WTRU 1504 about the best beam, mB 1503 may use that particular beam for the next communication with WTRU 1504. Simultaneously, when R-WTRU1 1505 and R-WTRU2 1506 are within transmission range of WTRU 1504, R-WTRU1 1505 and R-WTRU2 1506 may also receive optimum mB 1503 beam feedback. From the reported mB 1503 beam identifier, R-WTRU1 1505 and R-WTRU2 1506 may estimate the relative position of WTRU 1504 and may accordingly adjust their beams associated with the relay link. Alternately or additionally, mB 1503 may echo the beam choice of WTRU 1504 via OBand signaling, so that any R-WTRUs that are outside the OBand transmission range of WTRU 1504, but within range of mB 1503 transmissions, may still obtain WTRU 1504 position information.

OBand signaling may also be used for beam tracking of WTRUs with less traffic or non-periodic/bursty traffic. For these inactive WTRUs there may be long periods of time between successive packet transmission and reception. This may lead to larger beam misalignment with their peer nodes than what may be corrected by beam-tracking procedures. So, some tracking related signaling may need to be exchanged to track user mobility between packet transmissions.

In IEEE 802.11ad, beam tracking packets may be appended to regular data packets exchanged between a WTRU and an mB. However, in the absence of regular data packet transmissions, the mB may set up a schedule for regular exchange of location information between the mB and the WTRU. Alternatively, OBand signaling may be used for beam tracking for inactive WTRUs. Then WTRU or mB may signal on the OBand when the data packet arrives in its buffer, addressed to the other node. Then, location information or beam tracking packets may be exchanged to correct any beam misalignment since last transmission, before regular packet exchange is attempted.

Figure 16:
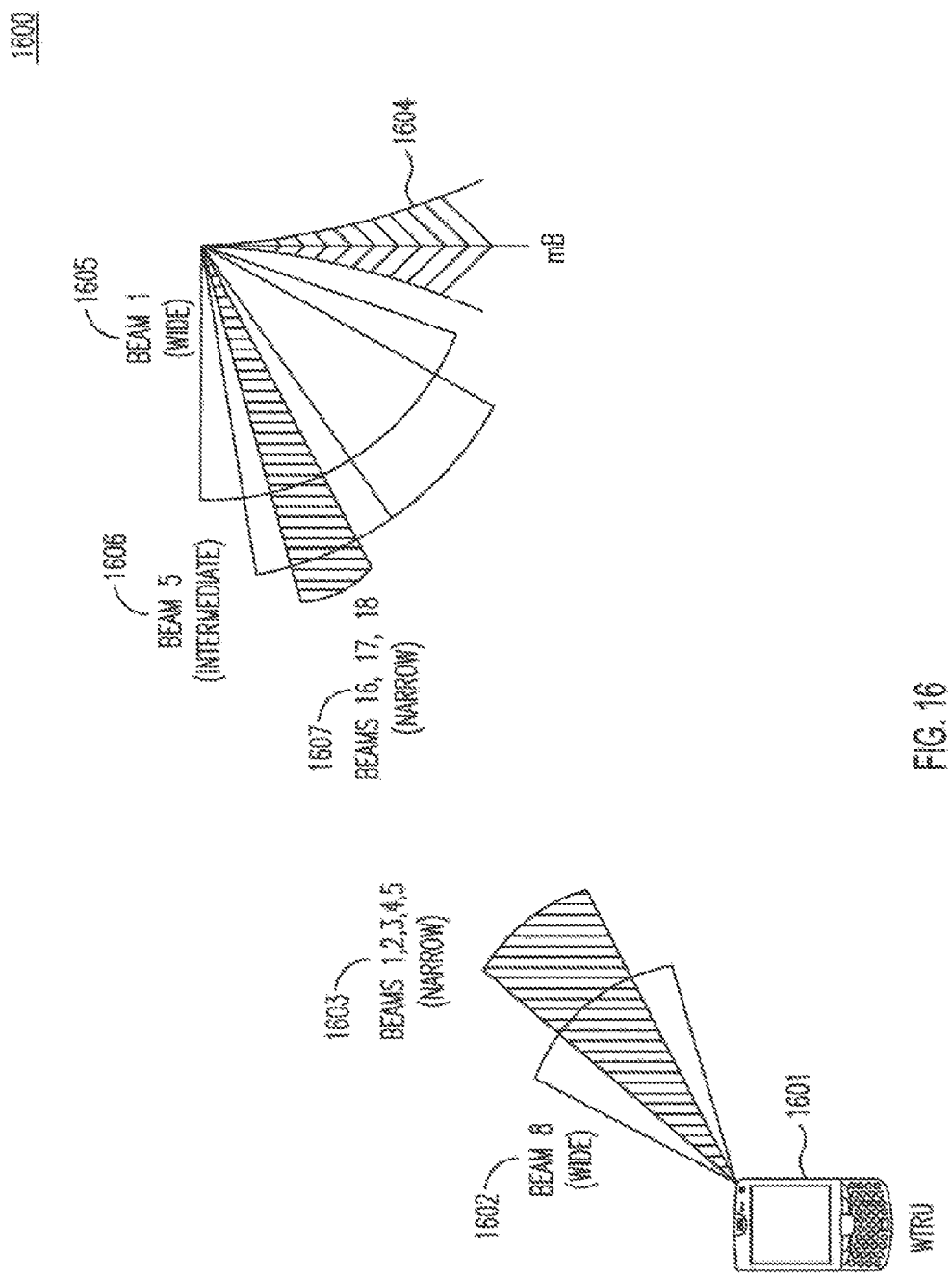
FIG. 16 is an example of the use of variable beamwidths.

Due to user mobility, beamwidth adaptation may be necessary. FIG. 16 shows an example of the use of variable beamwidths 1600. Beam tracking according to IEEE 802.11ad procedures involves some control message overhead. This involves transmission of training fields for transmitter or receiver beam evaluation. These training fields are transmitted using different transmit beams for transmitter training, and received using different receive beams for receiver training. If user mobility is high, then more frequent exchange of the training fields may be used. For high user mobility, wider beamwidths may be used, which may require less frequent updates. Each node (mB/WTRU) may maintain a mapping of beams of varying beamwidths that are related to each other as shown in FIG. 16. WTRU 1601 may maintain a mapping of narrow beams 1603 and wide beams 1602. Similarly, mB 1604 may maintain a mapping of narrow beams 1607, intermediate beams 1606, and wide beams 1605. For example, mB 1604 and WTRU 1601 may know that a set of narrow beams and a wider beam all point in the same direction, and that the wider beam may be used if contact is lost or performance is degrading while using one of the narrow beams belonging to the set. Alternatively, the node (mB/WTRU) may decide to switch to the wider beam to reduce the beam tracking overhead. The decision to switch to the wider beam may be communicated from mB 1604 to WTRU 1601 or from WTRU 1601 to mB 1604 so that SP allocation and Modulation and Coding Scheme (MCS) selection may be changed.

Figure 17:
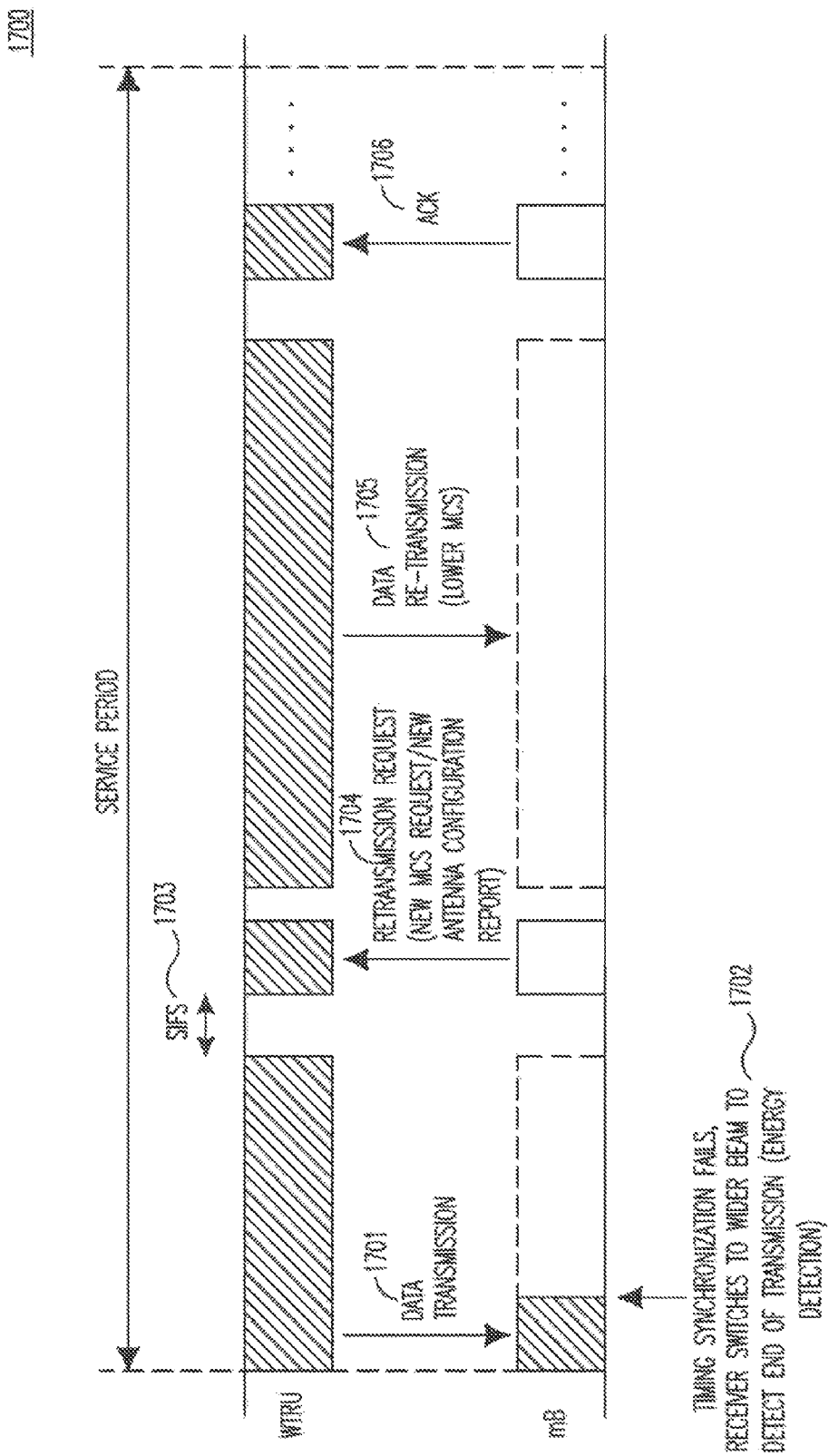
FIG. 17 is an example of a receiver beam adaptation procedure.

FIG. 17 illustrates a receiver beam adaptation procedure 1700. The WTRU and mB start communicating and transmitting data 1701 in the SP using the beams identified earlier in accordance with any of the methods described herein. However, due to relative motion, the beams may no longer be aligned correctly. Therefore, timing synchronization fails at the receiver (mB), and upon detecting the failure the receiver may switch to a wider beam pointing in the same direction to detect the end of packet transmission 1702. Packet transmission may be detected via energy detection. Then, the mB may send a re-transmission request 1704 to the WTRU after a SIFS 1703 duration following end of packet transmission. The re-transmission request may also contain a request for a new MCS due to a changed receive antenna configuration, or may contain information related to the new antenna configuration itself, such as beamwidth or gain. The WTRU may attempt packet retransmission 1705 using the MCS level requested by the mB or by selecting the appropriate MCS based on a new receive antenna configuration reported by the mB, which then may send an ACK 1706.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
    a receiver configured to receive a request, from a base station (BS), to perform directional signal strength measurements for one or more received signals;
    the receiver further configured to receive a request, from the BS, to provide location data associated with the WTRU;
    a transmitter configured to transmit directional signal strength measurements, based on the request and the location data associated with the WTRU, to facilitate generation of a directional radio environment map (DREM); and
    the receiver further configured to receive a request to switch to a new transmission and reception beam pair based on the DREM.

2. The WTRU of claim 1, further comprising:
    the receiver further configured to receive a request from the BS to provide orientation data associated with the WTRU; and
    the transmitter further configured to transmit the orientation data.

3. The WTRU of claim 1, further comprising:
    the transmitter further configured to transmit historical data on beams used by the WTRU.

4. The WTRU of claim 1, wherein the directional signal strength measurements are performed on inter-cell signals.

5. The WTRU of claim 1, further comprising:
    the receiver further configured to receive location information associated with the BS.

6. The WTRU of claim 1, further comprising:
    a processor configured to filter the directional signal strength measurements based on time and GPS coordinates.

7. A method performed by a wireless transmit/receive unit (WTRU), the method comprising:
- receiving a request, from a base station, to perform directional signal strength measurements for one or more received signals;
- receiving a request from the BS to provide location data associated with the WTRU;
- transmitting directional signal strength measurements based on the request and the location data associated with the WTRU to facilitate generation of a directional radio environment map (DREM); and
- receiving a request to switch to a new transmission and reception beam pair based on the DREM.

8. The method of claim 7, further comprising:
- receiving a request, from the BS, to provide orientation data associated with the WTRU; and
- transmitting the orientation data.

9. The method of claim 7, further comprising:
- transmitting historical data on beams used by the WTRU.

10. The method of claim 7, wherein the directional signal strength measurements are performed on inter-cell signals.

11. The method of claim 7, further comprising:
- receiving location information associated with the BS.

12. The method of claim 7, further comprising:
- filtering the performed directional signal strength measurements based on time and GPS coordinates.

13. A base station (BS) comprising:
- a transmitter configured to transmit a request, to a wireless transmit/receive unit (WTRU), to perform a directional signal strength measurement on a signal received by the WTRU and to provide location data associated with the WTRU;
- a receiver configured to receive, from the WTRU, the performed directional signal strength measurement and the location data associated with the WTRU;
- a processor configured to generate a directional radio environment map (DREM) based on the performed directional signal strength measurement and the location data associated with the WTRU; and
- the processor configured to perform a handover of a communication link from a primary beam to a secondary beam, on a condition that the primary beam is disrupted, wherein the secondary beam is selected based on the generated DREM.

* * * * *